(12) United States Patent
Dunning et al.

(10) Patent No.: US 7,114,317 B2
(45) Date of Patent: Oct. 3, 2006

(54) COLLECTOR AND SEPARATOR APPARATUS FOR LAWN AND GARDEN

(75) Inventors: Charles Everett Dunning, Neenah, WI (US); Richard Bernard Saathoff, Neenah, WI (US)

(73) Assignee: BestRake, LLC, Neenah, WI (US)

( * ) Notice: Subject to any disclaimer, the term of this patent is extended or adjusted under 35 U.S.C. 154(b) by 233 days.

(21) Appl. No.: 10/724,316

(22) Filed: Nov. 26, 2003

(65) Prior Publication Data

US 2004/0139714 A1   Jul. 22, 2004

Related U.S. Application Data

(62) Division of application No. 10/045,123, filed on Nov. 9, 2001, now Pat. No. 6,658,833.

(60) Provisional application No. 60/247,456, filed on Nov. 9, 2000.

(51) Int. Cl.
  *A01D 43/00* (2006.01)
  *A01D 43/06* (2006.01)

(52) U.S. Cl. ....................................... 56/202

(58) Field of Classification Search .............. 56/13.1, 56/13.2, 16.9, 202, 344, 12.9, 13.5, 14.3, 56/DIG. 8, DIG. 12; 15/340.4, 346, 83, 15/340.3
See application file for complete search history.

(56) References Cited

U.S. PATENT DOCUMENTS

| | | | |
|---|---|---|---|
| 1,055,792 A | 3/1913 | Plock | |
| 2,039,115 A | 4/1936 | Reif | |
| 2,505,576 A | 4/1950 | Reitan | |
| 2,542,635 A | 2/1951 | Davis et al. | |
| 2,669,078 A | 2/1954 | Gregory | |
| 2,700,863 A | 2/1955 | Etem | |
| 2,846,024 A | 8/1958 | Bremi | |
| 2,964,896 A | 12/1960 | Finocchiaro | |
| 2,990,019 A | 6/1961 | Finn | |
| 3,094,830 A | 6/1963 | Leblanc | |
| 3,184,777 A | 5/1965 | Norden | |
| 3,406,424 A | 10/1968 | Rush | |
| 3,512,345 A | 5/1970 | Smith | |
| 3,664,099 A | 5/1972 | Chouinard | |
| 3,688,479 A | 9/1972 | Martinson et al. | |
| 3,744,653 A | 7/1973 | Jensen | |
| 3,783,592 A | 1/1974 | Schraut | |
| 3,822,533 A | 7/1974 | Oranje | |
| 3,872,654 A | 3/1975 | Brundage | |
| 3,953,184 A | 4/1976 | Stockford | |
| 3,987,606 A | 10/1976 | Evans | |
| 3,988,133 A | 10/1976 | Schady | |
| 3,995,415 A | 12/1976 | Hoffmann | |
| 3,999,316 A | 12/1976 | Palmer | |
| 4,064,679 A | 12/1977 | Spinner | |
| 4,117,983 A | 10/1978 | Browning | |
| 4,149,861 A | 4/1979 | Sogo et al. | |
| 4,268,288 A | 5/1981 | Coombs | |

(Continued)

OTHER PUBLICATIONS

Bear Cat Company promotional brochure (30M1112JR) obtained from dealer in Dec. 2005, p. 19, illustrating the Bear Vac Pro Model 75011.

(Continued)

*Primary Examiner*—Árpád Fábián Kovács

(57) ABSTRACT

An apparatus for collection and reduction of yard debris combining a frontally facing rotor-assisted vacuum pick up with a chipper-shredder-blower unit to induce airflow for entraining debris collected at the vacuum pick up; reduce the entrained debris to a more manageable volume; and impel the reduced debris to a free-flow-separator device for removing the debris from the air in which it is entrained.

39 Claims, 7 Drawing Sheets

U.S. PATENT DOCUMENTS

| | | |
|---|---|---|
| 4,426,830 A | 1/1984 | Tackett |
| 4,532,755 A | 8/1985 | Schemelin et al. |
| 4,589,249 A | 5/1986 | Walker et al. |
| 4,600,410 A | 7/1986 | Baillie |
| 4,819,417 A | 4/1989 | Bryant et al. |
| 4,835,951 A | 6/1989 | Walker |
| 4,868,948 A | 9/1989 | Arnold |
| 4,924,664 A * | 5/1990 | Hicks et al. ............... 56/202 |
| 5,231,827 A | 8/1993 | Connolly et al. |
| 5,287,684 A | 2/1994 | Beroth |
| 5,340,035 A | 8/1994 | Ford |
| 5,381,970 A | 1/1995 | Bold et al. |
| 5,435,118 A | 7/1995 | Cobile |
| 5,540,038 A | 7/1996 | Bold et al. |
| 5,642,864 A | 7/1997 | Middlesworth |
| 5,685,134 A | 11/1997 | Thornburg |
| 5,707,017 A | 1/1998 | Paolucci |
| 5,778,648 A | 7/1998 | Parkes et al. |
| 5,799,365 A | 9/1998 | Firdaus |
| 5,848,521 A | 12/1998 | Kobayashi |
| 5,875,620 A | 3/1999 | Goeke |
| 5,911,671 A | 6/1999 | Heitstuman |
| D413,125 S | 8/1999 | Vachon |
| 5,931,396 A | 8/1999 | Firdaus |
| 5,983,613 A | 11/1999 | Winter |
| 6,029,312 A | 2/2000 | Whitney |
| 6,089,006 A | 7/2000 | Langford |
| 6,105,350 A | 8/2000 | Vachon |
| 6,182,383 B1 | 2/2001 | Reed |
| 6,226,970 B1 | 5/2001 | Busboom |

OTHER PUBLICATIONS

Crary Bear Cat Owner Operator's Manual For Bear Vac Pro Models 75011 and 75111 (Manual P/N 14032-00, Rev. 03/02) Downloaded from internet website: http://www.bearcatproducts.com), no date.

Crary Bear Cat Parts Catalog For Bear Vac Pro Models 75011 and 75111 (Part # 14031-00, Rev. Mar. 2002, Downloaded from http://www.bearcatproducts.com.

* cited by examiner

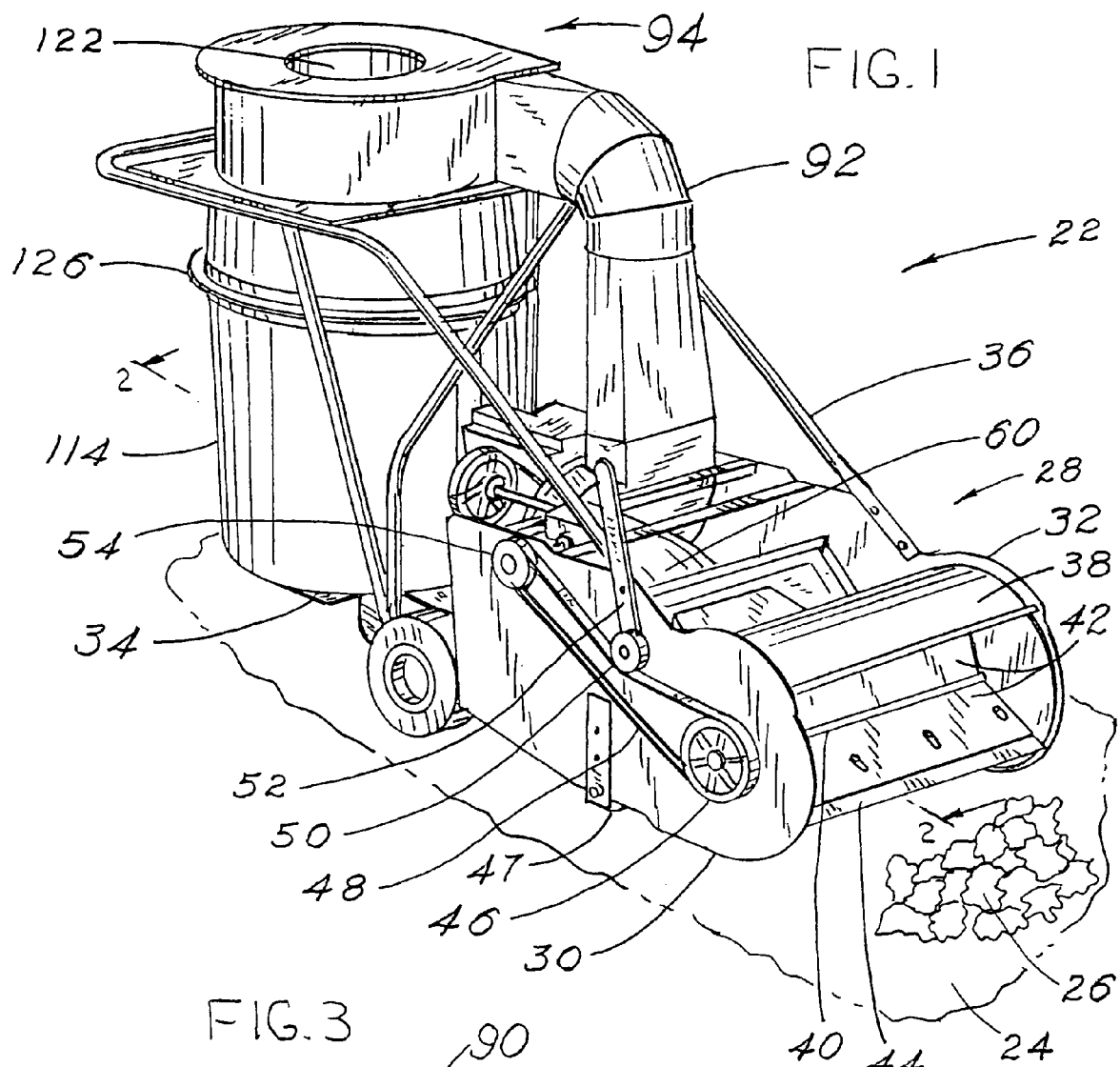
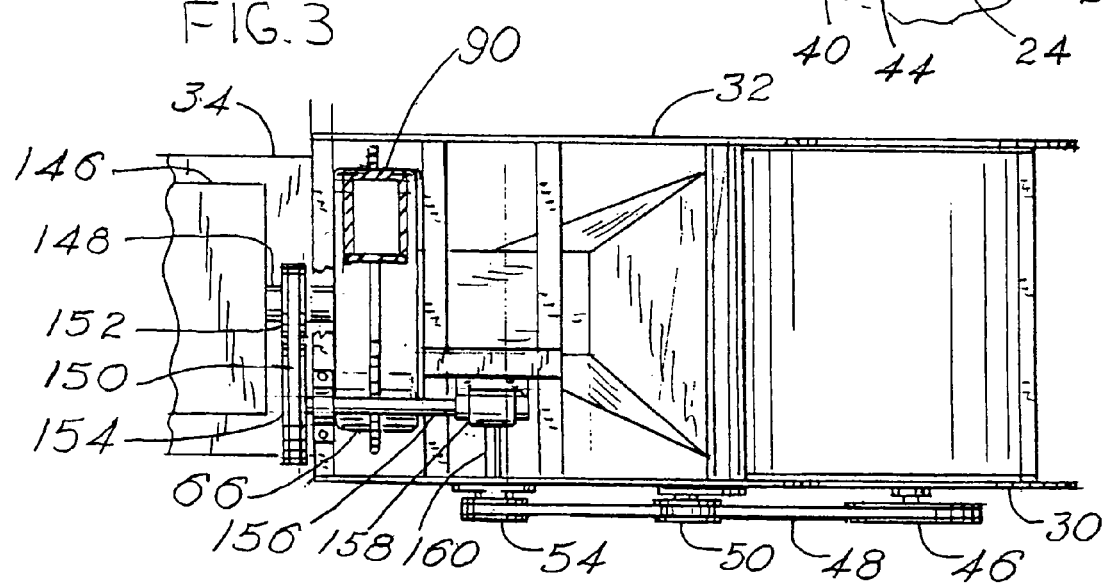

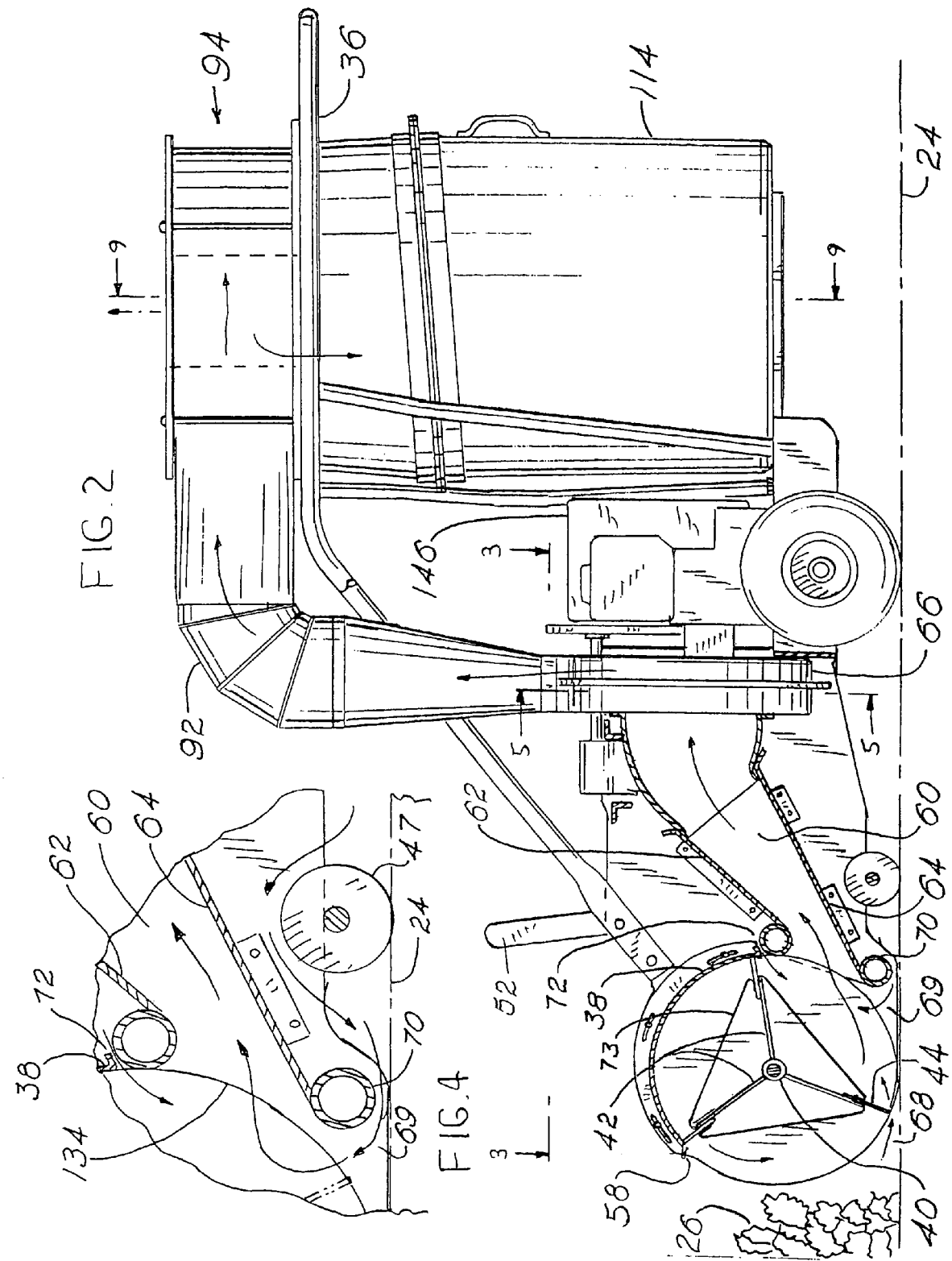

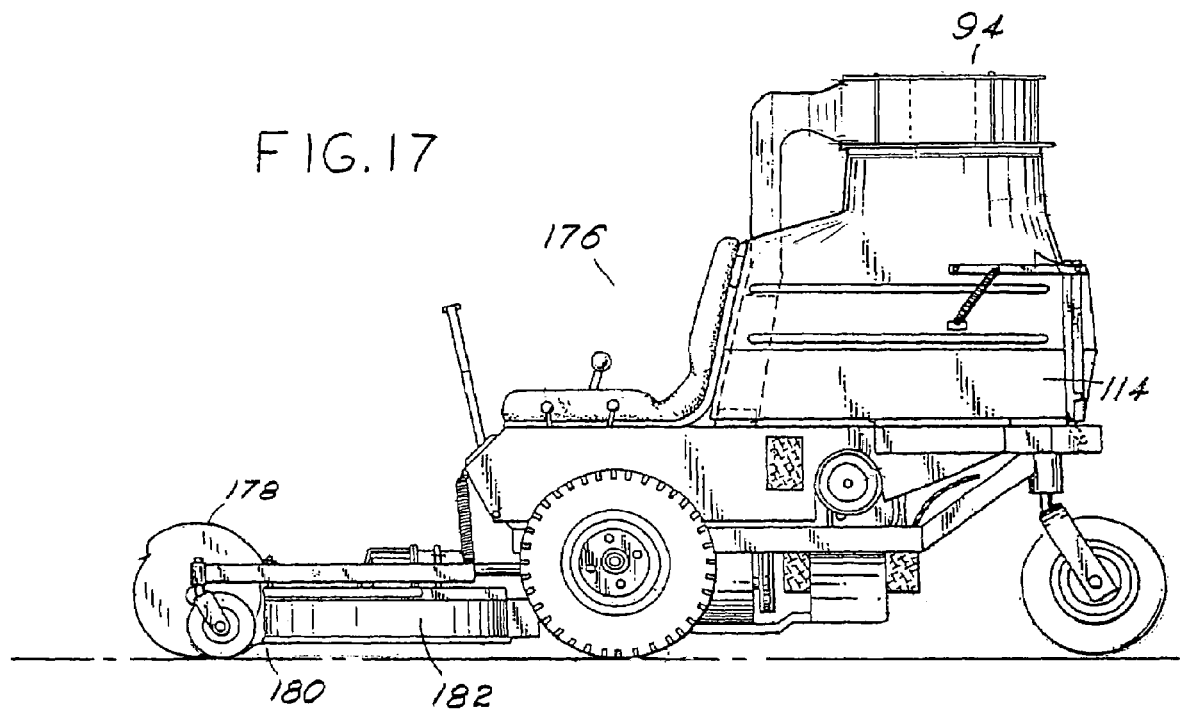
FIG. 17
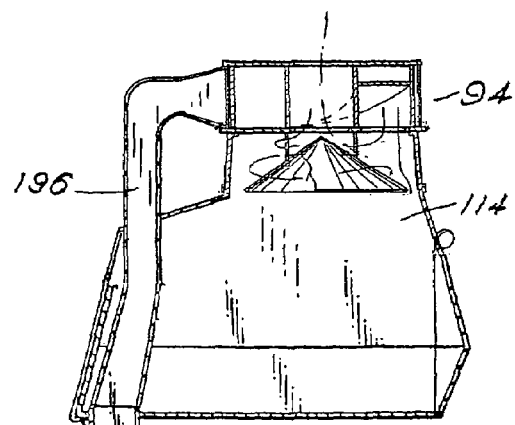
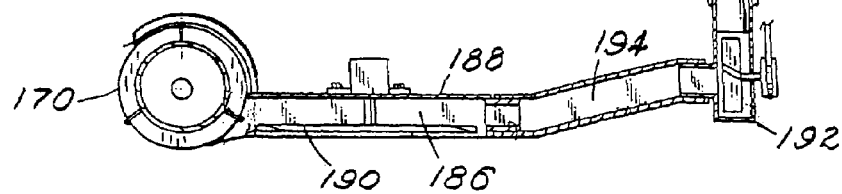
FIG. 18

COLLECTOR AND SEPARATOR APPARATUS FOR LAWN AND GARDEN

FIELD OF THE INVENTION

This application is a division of and claims priority of the earlier-filed application having Ser. No. 10/045,123 filed on Nov. 9, 2001, now U.S. Pat. No. 6,658,833 which claims the benefit of Provisional Application No. 60/247,456, filed Nov. 9, 2000. This application also relates to continuation-in-part application Ser. No. 10/846,029, now U.S. Pat. No. 6,904,742 B2, and to divisional application Ser. No. 11/145,289 filed Jun. 3, 2005. This invention applies to an apparatus for collection and reduction of yard debris in thick layers and deep piles.

BACKGROUND

Homeowners, commercial-property owners, and companies who provide care for lawns have an ongoing challenge of how to remove leaves, grass clippings, and other debris from lawns, gardens and paved surfaces, particularly when the debris accumulates to a depth of over an inch. Several companies now manufacture and sell combination vacuum-chipper-shredder machines intended for this purpose. Some U.S. patents illustrating the range of these machines are as follows: U.S. Pat. Nos. 5,931,396 and 5,799,365, both assigned to MTD Products; U.S. Pat. Nos. 5,381,970 and 5,231,827, both assigned to Garden Way Incorporated; and U.S. Pat. No. 5,642,864, assigned to Simplicity Manufacturing, Inc. However, the dilemma with many prior-art units is that while they are reasonably adapted to vacuum a thin layer of debris from the ground, they do not function well when there is a thick layer of leaves or other debris. When there is a covering of several inches of leaves, the collector duct merely pushes a stack of leaves ahead of the unit instead of drawing the leaves into the machine. If the collector duct is raised to be able to take leaves from the top of the overlayer, it is no longer so effective in collecting the leaves and other debris close to the ground. Accordingly, while the available machines are somewhat effective in removing the thin layers of debris, the task of collecting thick layers of debris, particularly deep piles of leaves, remains quite problematic. Typical prior art machines, such as those shown in U.S. Pat. Nos. 5,799,365 and 5,231,827, have a vacuum pick-up opening wherein the plane of the opening is parallel to the ground, while the device shown in U.S. Pat. No. 5,642,864 has its opening disposed at an angle of about 45 degrees with respect to the ground. Such devices are poorly adapted to the tasks for which machine assistance is needed most.

Many existing machines depend primarily on flow of air to lift and entrain the leaves and other debris for transport through chipper shredder devices, and then to blow the reduced debris into accumulation units. To separate the debris from the air in which it is entrained, the machines rely on some form of filtration, with either fabric bags or screens. However, as leaf fragments and other debris collect on the filter, resistance to the flow of air increases, diminishing the air flow rate, and thereby, reducing the effectiveness of the vacuum pick-up opening.

OBJECT OF THE INVENTION

It is an object of the present invention to provide a machine which effectively removes deep piles of leaves and other debris. In preferred embodiments, the thin layer of residual debris which might otherwise be left for later removal in another step is cleanly removed at the same time.

Another object of the invention is to provide a unit combining a front-facing vacuum-assisted opening with a rotor which serves to impel heavy leaves and debris toward a vacuum slot while creating air flow close to the surface to be cleaned in a direction which is generally parallel to that surface for picking up finer debris.

Another object of the invention is to provide a rotor-vacuum combination which both frontally engages piles of leaves and other debris and also brushes the leaves and other debris from the surface to be cleaned while entraining the debris in an air stream whence the debris may be reduced in size.

Another object of the invention is to provide a means for separating the air stream with entrained debris into a solids-depleted stream and a solids-enriched stream for collection and disposition of the debris.

It is another object of the present invention to remove deep piles of leaves and other debris.

SUMMARY OF THE INVENTION

These objects are provided by an apparatus for collection and reduction of yard debris comprising a combination of a frontally facing rotor-assisted vacuum pick up, a chipper-shredder-blower unit which (i) induces an airflow for entraining the debris collected at said pick up; (ii) reduces the debris entrained in the airflow to a more manageable volume and (iii) impels the reduced debris to a free-flow-separator device for removing the debris from the air in which it is entrained.

More particularly, this invention relates to an apparatus for collecting yard debris comprising: a frame having a shredder blower unit mounted thereupon; a collector-rotor mounted on the frame comprising impeller elements adapted to: (i) engage a surface, (ii) collect yard debris thereupon, and (iii) impel the yard debris toward the shredder blower unit; an air-solids separator mounted on the frame operatively connected to the shredder blower unit for separating the yard debris into a debris-enriched stream and a debris-depleted stream by action of body forces thereupon; and an accumulation chamber adapted to receive the debris-enriched stream from the air-solids separator; wherein the collector rotor means is configured for substantially untrammeled engagement with yard debris having a depth of at least about two (2) inches.

In another aspect this invention relates to an apparatus for collecting yard debris comprising: a frame; a shredder blower unit mounted on the frame; a collector rotor mounted on the frame comprising impeller elements adapted to: (i) engage a surface, collect yard debris thereupon, and (ii) impel said the debris toward the shredder blower unit; an air-solids separator mounted on the frame operatively connected to the shredder blower unit for separating the yard debris into a debris-enriched stream and a debris-depleted stream; and an accumulation chamber adapted to receive the debris-enriched stream from the air-solids separator; wherein the collector rotor is configured for substantially untrammeled engagement with yard debris having a depth of at least about two (2) inches.

In still another aspect this invention relates to an apparatus for collecting yard debris comprising: (A) a frame; (B) a shredder blower unit mounted on the frame; (C) a collector rotor mounted on the frame comprising impeller elements adapted to: (i) engage a surface, collect yard debris thereupon, and (ii) impel the yard debris toward the shredder blower unit; (D) an air-solids separator means mounted on the frame operatively connected to the shredder blower unit for separating the yard debris into a debris-enriched stream and a debris-depleted stream by action of body forces thereupon; and (E) an accumulation chamber adapted to receive the debris-enriched stream from the air-solids separator.

Yet another aspect of this invention relates to an apparatus for collecting and reducing yard debris comprising: (A) a frame adapted for movement in a principal direction upon a surface; (B) a first duct mounted on the frame having an entrance and an exit; (C) a collector rotor assembly comprising: a collector rotor body disposed at the entrance to the first duct having a substantially horizontal axis of rotation generally normal to the principal direction; and a plurality of impeller elements mounted upon the collector rotor body, wherein the impeller elements extend radially from the collector rotor body by at least about one quarter of an inch and are adapted to: (i) sweep over the surface, (ii) collect yard debris thereupon, and (iii) impel the yard debris toward the duct entrance, wherein the collector rotor assembly and the first duct are configured for substantially untrammeled frontal engagement with yard debris having a depth of at least about two (2) inches; (D) a second duct mounted upon the frame having an entrance and an exit; (E) a shredder blower unit, disposed between the exit to the first duct and the entrance to the second duct, adapted to: (i) provide suction at the entrance of the first duct; (ii) induce a flow of air through the first and second ducts; and (iii) reduce yard debris entrained in the flow of air as it passes through the shredder blower unit; (F) an air-solids separator disposed at the exit to the second duct for separating the reduced yard debris in the flow of air induced by the shredder blower into a debris-enriched stream and a debris-depleted stream; (G) an accumulation chamber mounted on the frame adapted to receive the debris-enriched stream from the air-solids separator; and (H) a power source mounted on the frame adapted to provide power to the shredder blower unit and the collector rotor.

In a preferred embodiment of the invention the impeller elements extend radially at least about an inch from the collector rotor body.

In another preferred embodiment the collector rotor assembly comprises a substantially gas-impervious impediment to unrestricted flow of air into the first duct and extends substantially athwart the entrance to the first duct.

A preferred collector rotor assembly comprises three impeller elements generally equispaced around the collector rotor body.

A more preferred collector rotor assembly further comprises fillets extending between adjacent impeller elements for limiting carriage of yard debris around the collector rotor assembly, wherein the fillets partially define generally concentric interrupted annular cavity spaces between adjacent impeller elements.

In a more preferred embodiment of this invention, a housing serves to limit the flow of air between the housing and the collector rotor assembly without substantially impeding air flow along the surface under the collector rotor assembly and into the entrance of the first duct; wherein this housing: (i) is disposed above the collector rotor assembly, (ii) is an arcuate portion of a generally cylindrical shell spanning an upper portion of the collector rotor assembly concentric to the axis of rotation of the collector rotor body, and (iii) engages each of the impeller element tips in flow-limiting proximity seriatim.

In another preferred embodiment, vertically extending seals are carried on the frame adjacent to the ends of the collector rotor assembly for limiting axial flow of airflow into the rotor assembly.

In another embodiment, vertically extending seals carried on the ends of the collector rotor assembly limit axial flow of airflow into the rotor assembly.

In a preferred embodiment, the housing means defines a frontal opening extending from the surface vertically to a height of at least four inches and a suction opening under the rotor extending rearwardly from the front of the apparatus at least to a line below the axis of rotation of the collector rotor body.

In another preferred embodiment, the impeller elements mounted on the collector rotor body are configured to allow intermittent rearward rushes of air under the forward side of the rotating rotor body into the entrance to the first duct, and pulsed forward rushes of air under the first duct and into the first duct entrance, thereby alternatingly collecting principally bulky yard debris from the forward side of the rotor body during the rearward rushes of air and enhancing collection of residual debris from the surface during the pulsed forward rushes of air.

A preferred embodiment of the invention further comprises an air-slot defined within the housing between the upper lip of the housing and the entrance to the first duct for allowing flow of air in a direction opposed to the direction of rotation of the collector rotor body and into the first duct and therein stripping leaves and debris from the rotating rotor assembly.

In another embodiment, the entrance to the first duct generally spans the length of the collector rotor body, and the duct converges rearwardly such that the convergence angle throughout the duct is generally less than 100 degrees.

In one embodiment, the shredder blower unit comprises a rotatable shaft having shredder elements mounted thereupon, wherein the axis of rotation of the shaft is parallel to the principal direction.

In a preferred embodiment of the invention, the air-solids separator comprises: (A) a first passage for accepting the flow of air bearing entrained reduced yard debris from the second duct; (B) a separation chamber adapted to receive the flow of air from the first passage; (C) a second passage adapted to exhaust the debris-depleted stream from the separation chamber into the atmosphere; and (D) a baffle for: (i) generally inhibiting secondary flow from the accumulation chamber; and (ii) impeding re-entrainment of fine particulates in the debris-depleted stream as it is discharged to the atmosphere; wherein the baffle is disposed to permit passage of entrained reduced yard debris into the accumulation chamber while impeding passage of fine particulates of reduced yard debris in air exhausted from the separation chamber through the second passage.

In a more preferred embodiment, the air-solids separator separates the reduced yard debris in the airflow induced by the shredder blower into a debris-enriched stream and a debris-depleted stream by action of body forces thereupon, wherein the separator comprises: (A) a separation chamber; (B) a first declivously extending curvilinear passage for conducting the flow of air bearing the entrained reduced yard debris from the second duct into the separation chamber, wherein the separation chamber adjoins the declivously extending curvilinear passage and is adapted to receive and direct the flow of air bearing debris from the declivously extending curvilinear passage in a direction generally tangential to the perimeter of the separation chamber; (C) a generally centrally located upwardly extending second passage for exhausting the debris-depleted stream from the separation chamber into the atmosphere; (D) a baffle extending generally outwardly from a central point below the entrance to the second passage, wherein the baffle is disposed generally below the exit from the declivously extending curvilinear first passage; and (E) an opening around the baffle into the accumulation chamber; wherein the baffle is disposed to permit passage of entrained reduced yard debris in the debris-enriched stream into the accumulation chamber while impeding secondary flows of air containing finely reduced debris fragments from re-entering the separation chamber.

In an embodiment, the shredder blower unit further comprises a chipper knife adapted to chip branches.

In another embodiment, the power source further comprises a means for supplying power to wheels mounted on the frame, thereby powering forward movement of the apparatus.

In one embodiment, the air-solids separator means further comprises an enclosure having at least one filtering element, and the airflow passes through the filtering element, leaving the yard debris retained in the enclosure.

Another aspect of the invention relates to an apparatus for collecting yard debris comprising: (A) a frame adapted for movement in a principal direction upon a surface; (B) a duct mounted on the frame having an entrance and an exit; (C) a collector rotor assembly comprising: a substantially impervious collector rotor body disposed and extending substantially athwart the entrance to the duct and having a substantially horizontal axis of rotation generally normal to the first direction; and a plurality of impeller elements mounted upon the collector rotor body, extending radially from the collector rotor body by at least about one quarter of an inch, and having approximately equal radial extensions from the axis of rotation of the collector rotor assembly, wherein the impeller elements are adapted to: (i) sweep over the surface, (ii) collect yard debris thereupon, and (iii) impel the yard debris into the duct entrance; (D) a housing disposed adjacent the entrance to the duct for limiting the flow of air between the housing and the collector rotor assembly without substantially impeding air flow along the surface under the collector rotor assembly and into the entrance of the duct, wherein the housing: (i) is disposed above the collector rotor assembly; (ii) engages each of the impeller element tips in flow-limiting proximity seriatim; and (iii) is configured to permit substantially untrammeled frontal engagement of the collector rotor assembly with yard debris having a depth of at least about two (2) inches; (E) an air-movement device connected to the exit of the duct and adapted to: (i) provide suction at the entrance of the duct, and (ii) induce a flow of air through the duct; and (F) a power source mounted upon the frame adapted to provide power to the air-movement device and the collector rotor.

In a preferred embodiment of the invention, the tips of the impellers further comprise pliable blades that are yieldable to hard objects encountered on the surface, but are sufficiently stiff to sweep debris from the undulating surface.

In a more preferred embodiment, the tips of the impellers comprise radially extending raker teeth adapted to engage and impel debris objects on the surface toward the duct entrance.

In a further embodiment, the housing comprises an arcuate portion of a generally cylindrical shell spanning an upper portion of the collector rotor assembly generally concentric to the axis of rotation of the collector rotor body, and which is disposed in flow-limiting proximity to at least one tip of one of the impeller elements during at least about one fourth of the time of each revolution of the collector rotor assembly.

In an embodiment, the duct is disposed such that a space at least ½ inch thick is preserved between the bottom of the duct and the surface, permitting forward air flow toward the duct entrance.

In a preferred embodiment, the cross-sectional area of the channel through the duct measured normal to the center flow line of the airflow through the duct remains generally constant along the center flow line.

In a further embodiment, the collector rotor assembly and the entrance of the duct are disposed along the advancing front of a lawnmower having a cutting path of a defined width.

In a preferred embodiment, the collector rotor assembly impels the yard debris into the mowing chamber within the mowing enclosure of the lawnmower.

In a more preferred embodiment, the air-movement means achieves an airflow volume of at least about twenty cubic feet per minute per inch of collector rotor assembly length.

In another preferred embodiment the present invention relates to an apparatus for separating entrained lawn debris from a transporting air stream by action of body forces thereupon comprising: (A) an apparatus for delivering a stream of air bearing entrained lawn debris; (B) a first passage having an entrance and exit, having the entrance adapted to receive the stream of air bearing entrained lawn debris, and the passage adapted for conducting the flow of air bearing entrained lawn debris from the entrance to the exit; (C) a separation chamber having a generally cylindrical outer wall section, with the separation chamber: (i) connected to the exit from the first passage; and (ii) adapted to: (a) receive and direct the stream of air bearing entrained lawn debris from the first passage in a direction primarily tangential to the generally cylindrical outer wall section of the separation chamber, and (b) separate the stream of air bearing entrained lawn debris into an outerly located debris-enriched stream and an innerly located debris-depleted stream; (D) an upper bulkhead to the separation chamber having defined therein, a generally centrally located second passage having an entrance and an exit, with the generally centrally located second passage adapted for: (i) receiving the innerly located debris-depleted stream from the separation chamber through the entrance, and (ii) conducting the innerly located debris-depleted stream to the exit and discharging it into the atmosphere; (E) the bulkhead of said separation chamber further: (i) extending generally horizontally from the second passage generally outwardly to the substantially cylindrical outer wall, and (ii) being disposed at generally the same height as the entrance to the second passage; (F) a baffle extending generally outwardly from a central point below the entrance to the second passage, wherein the baffle is disposed generally below the exit of the first passage, and the outer periphery of the baffle is spaced inwardly from the generally cylindrical outer wall section; and (G) an opening around the baffle into the interior of an accumulation chamber below the baffle; wherein the baffle is disposed to permit passage of entrained yard debris into the accumulation chamber while impeding passage of fine particulates of reduced yard debris from the accumulation chamber into the debris-depleted stream discharged from the separation chamber through the second passage.

Preferably, the plane of the said baffle periphery is disposed below the lowermost portion of the upper bulkhead by a distance of less than about 0.6 times the inside diameter of the separation chamber.

In another preferred embodiment, the baffle periphery is disposed below the lowermost portion of the entrance to the second passage by a distance of less than about 0.6 times the inside diameter of the separation chamber.

In one embodiment the upper bulkhead of the separation chamber further comprises a substantially planar surface generally normal to the axis of the substantially cylindrical outer wall and has an opening comprising the entrance of the second passage.

In another embodiment, the upper bulkhead of the separation chamber further comprises a generally semi-toroidal surface and has an opening comprising the entrance of the second passage.

Preferably, the upper bulkhead has as its substantially only interruptions, openings comprising the exit of the first passage and the entrance of the second passage.

In a more preferred embodiment, the first passage extends declivously from its entrance toward its exit and directs the stream of air bearing entrained lawn debris into the separation chamber.

Preferably, (A) the first passage is curvilinear in a plane generally perpendicular to the axis of the generally cylindrical outer wall section, (B) the outer wall of the curvilinear passage is disposed approximately coincident with the generally cylindrical outer wall section of the separation chamber, and (C) the generally cylindrical outer wall section of the separation chamber is disposed at least about three inches outward from the perimeter of the entrance to the second passage.

In a preferred embodiment, the generally cylindrical outer wall section of the separation chamber is disposed at least about five inches outwardly from the perimeter of the entrance to the second passage.

In a preferred embodiment, the baffle further comprises an upright cone having its apex pointing toward the entrance of the second passage.

Preferably, the cone periphery and the outer wall section of the separation chamber are generally circular.

In a preferred embodiment, the opening around the periphery further comprises an annular opening between the periphery of the baffle and the outer wall section of the separation chamber.

Preferably, the vertical distance from the apex of the cone to the plane of the entrance of the second passage is less than about 0.6 times the diameter of the entrance to the second passage.

In one embodiment, the accumulation chamber is approximately cylindrical and has a slidable opening in a plane at an angle of about 75 degrees to about 90 degrees to the axis of the cylinder.

In a preferred embodiment, the stream of air bearing entrained lawn debris swirls around the separation chamber with a tangential perimeter velocity of at least about 2000 feet per minute, causing the entrained reduced lawn debris to move toward the generally cylindrical outer wall of the separation chamber by action of body forces thereupon.

Preferably, the radial distance from the baffle periphery to the outer wall of the separation chamber is less than about one fourth of the inside diameter of the separation chamber, measured in approximately the same plane as the plane of the baffle periphery.

In another embodiment, the accumulation chamber further comprises a flexible bag-like container, such as a paper bag or a plastic bag.

In still another embodiment, the device for delivering a stream of air bearing entrained lawn debris further comprises a lawnmower having a discharge duct connected to the entrance of the first passage.

In another aspect, this invention relates to a free-flow apparatus for separating entrained lawn debris from a transporting air stream by action of body forces thereupon comprising: (A) an apparatus for delivering a stream of air bearing entrained lawn debris; (B) a first passage having an entrance and exit, with the entrance adapted to receive the stream of air bearing entrained lawn debris, and the passage adapted for conducting the stream of air bearing entrained lawn debris from the entrance to the exit; (C) a separation chamber having a generally frusto-conical outer wall section, with the separation chamber: (a) connected to the exit from the first passage; and (b) adapted to: (i) receive and direct the stream of air bearing entrained lawn debris from the first passage in a direction primarily tangential to the frusto-conical outer wall section of the separation chamber, and (ii) separate the stream of air bearing entrained lawn debris into an outerly located debris-enriched stream and an innerly located debris-depleted stream; (D) a generally centrally located second passage having an entrance and an exit, and being adapted for (i) receiving the innerly located debris-depleted stream from the separation chamber through the entrance, and (ii) conducting the innerly located debris-depleted stream to the exit and discharging it into the atmosphere; (E) an upper bulkhead to the separation chamber having defined therein a generally centrally located second passage having an entrance and an exit, with the upper bulkhead extending from the second passage generally outwardly to the generally frusto-conical outer wall section; (F) a baffle extending generally outwardly from a central point below the entrance to the second passage, and disposed generally below the exit of the first passage, wherein the outer periphery of the baffle is disposed inwardly from the generally frusto-conical outer wall section, and below the uppermost portion of the first passage by a distance of less than 1.2 times the inside diameter of the separation chamber proximate the baffle; and (G) an opening around the baffle into the interior of an accumulation chamber below the baffle; wherein the baffle is disposed to permit passage of entrained yard debris into the accumulation chamber while impeding passage of fine particulates of reduced yard debris from the accumulation chamber into the air discharged from the separation chamber through the second passage.

In a preferred embodiment, (A) the first passage is curvilinear in a plane generally perpendicular to the axis of the generally cylindrical outer wall, (B) the outer wall of the curvilinear passage is disposed generally coincident with the generally frusto-conical outer wall section of said separation chamber, (C) the bulkhead is disposed at generally the same height as the entrance to the second passage, and (D) the generally frusto-conical outer wall section of the separation chamber is disposed at least about three inches radially outward from the perimeter of the entrance to the second passage.

Preferably, the first passage comprises substantially the only passage for conducting air flow into the separation chamber, and the second passage comprises substantially the only passage for conducting the innerly located debris-depleted stream out of the separation chamber.

In a preferred embodiment, the device for delivering a stream of air bearing entrained reduced lawn debris further comprises a shredder blower.

In another aspect, this invention relates to a free-flow apparatus for separating entrained lawn debris from a transporting air stream by action of body forces thereupon comprising: (A) an apparatus for delivering a stream of air bearing entrained lawn debris; (B) a primary-separation duct having an entrance and exit, wherein the entrance is adapted to receive the stream of air bearing entrained lawn debris, the duct is adapted for conducting the stream of air bearing entrained lawn debris from the entrance to the exit; and the primary-separation duct has a generally curvilinear outer surface spanning an arc of at least about arc cosine(RI/RO)

circumferentially along its length, having the primary-separation duct adapted to direct the stream of air bearing entrained lawn debris to flow generally circumferentially along its length and initiate separation of the stream of air bearing entrained lawn debris into an outerly located debris-enriched stream and an innerly located debris-depleted stream, wherein RI=radius of curvature for the generally curvilinear inner surface of the primary-separation duct, and RO=radius of curvature for the generally curvilinear outer surface;

(C) a secondary-separation chamber connected to the exit from the primary-separation duct and having a generally annular outer wall defining a primary axis generally coincident with the center of curvature of the generally annular outer wall, the functions of the secondary-separation chamber further comprising (i) receiving and directing the streams of air bearing entrained lawn debris from the primary-separation duct in a direction generally tangential to the generally annular outer wall of the secondary-separation chamber, (ii) directing the outerly located debris-enhanced stream from the primary-separation duct to flow adjacent to the outer wall of the secondary-separation chamber, (iii) directing the innerly located debris-depleted stream from the primary-separation duct to flow radially inward of the debris-enriched stream, and (iv) further separating the streams of air bearing entrained lawn debris into an upwardly and inwardly directed debris-depleted stream and a downwardly and outwardly directed debris-enriched stream; (D) a generally centrally located passage having an entrance and an exit, and being adapted for: (i) receiving the upwardly and inwardly directed debris-depleted stream from the secondary-separation chamber through the entrance, and (ii) conducting this stream to the exit and discharging it into the atmosphere; (E) a baffle extending generally outwardly from a central point below the entrance to the passage, having the outer periphery of the baffle spaced inwardly from the generally annular outer wall; and (F) an opening around the baffle into the interior of an accumulation chamber below the baffle; wherein the baffle is disposed to permit passage of entrained yard debris in the downwardly and outwardly directed debris-enriched stream into the accumulation chamber while impeding passage of fine particulates of reduced yard debris from the accumulation chamber into air discharged from the separation chamber through the passage.

Preferably, the baffle periphery is disposed below the uppermost portion of the primary-separation duct by a distance of less than 1.2 times the inside diameter of the secondary-separation chamber having a generally annular outer wall, with this inside diameter being measured in the plane of the baffle periphery.

More preferably, the baffle periphery plane is disposed below the uppermost portion of the entrance to the passage by a distance of less than about 0.6 times the inside diameter of the secondary-separation chamber having a generally annular outer wall, with this inside diameter being measured in the plane of the baffle periphery.

In one embodiment, the axis of curvature of the primary-separation duct is disposed generally coincident with the primary axis.

Still another aspect of this invention relates to a free-flow apparatus for separating entrained lawn debris from a transporting air stream by action of body forces thereupon comprising: (A) an apparatus for delivering a stream of air bearing entrained lawn debris; (B) a separation chamber having an upper bulkhead and an outer wall; (C) a first passage having an entrance and exit, having the entrance adapted to receive the stream of air bearing entrained lawn debris, and being adapted for conducting the stream of air bearing entrained lawn debris from the entrance to the separation chamber and directing the stream of air bearing entrained lawn debris into the separation chamber in a direction primarily tangential to the outer wall of the separation chamber; wherein the separation chamber is adapted to separate the stream of air bearing entrained lawn debris into an outerly located debris-enriched stream and an innerly located debris-depleted stream; (D) a generally centrally located second passage having an entrance and an exit, wherein the generally centrally located second passage is adapted for: (i) receiving the innerly located debris-depleted stream from the separation chamber through the entrance, and (ii) conducting the innerly located debris-depleted stream to the exit and discharging it into the atmosphere; (E) a baffle extending generally outwardly from a central point below the entrance to the second passage; having the outer periphery of the baffle spaced inwardly from the outer wall; and (F) an opening around the baffle into the interior of an accumulation chamber below the baffle, having the baffle disposed to permit passage of the innerly located debris-depleted stream into the second passage while impeding passage of fine particulates of reduced yard debris from the accumulation chamber into the air discharged from the separation chamber through the second passage; wherein the overall height of the apparatus from the uppermost portion of the apparatus to the plane of the outer periphery of the baffle is less than about 1.2 times the inside diameter of the separation chamber proximate the baffle periphery.

Preferably, the connection of the exit of the first passage into the separation chamber is disposed below the upper bulkhead.

In a preferred embodiment, the first passage is curvilinear in a plane generally perpendicular to the axis of the outer wall and has its concave surface generally concentric about the axis.

Yet another aspect of this invention relates to a free-flow apparatus for separating entrained lawn debris from a transporting air stream by action of body forces thereupon, comprising: (A) an apparatus for delivering a stream of air bearing entrained lawn debris having a flow rate of at least about 300 cubic feet per minute; (B) a primary-separation duct having an entrance and exit, with the entrance adapted to receive the stream of air bearing entrained lawn debris, and the duct adapted for conducting the stream of air bearing entrained lawn debris from the entrance to the exit; wherein the primary-separation duct (i) has a generally curvilinear outer surface spanning an arc of at least about arc cosine RI/RO circumferentially along its length and has a radius of curvature of its generally curvilinear outer surface less than about 36", (ii) measures at least about 4" perpendicular to its plane of curvature and at least about 2" in the radial direction, and (iii) is adapted to direct the stream of air bearing entrained lawn debris to flow generally circumferentially along its length and initiate separation of the stream of air bearing entrained lawn debris into an outerly located debris-enriched stream and an innerly located debris-depleted stream, wherein RI=radius of curvature of the generally curvilinear inner surface of the primary-separation duct, and RO=radius of curvature of the generally curvilinear outer surface;

(C) a secondary-separation chamber less than about 36" in diameter and connected to the exit from the primary-separation duct and having a generally annular outer wall defining a primary axis generally co-incident with the center of curvature of the generally annular outer wall, the secondary-separation chamber further comprising a shape for (i) receiving and directing the streams of air bearing entrained lawn debris from the primary-separation duct in a direction generally tangential to the generally annular outer wall of the secondary-separation chamber, (ii) directing the outerly located debris-enhanced stream from the primary-separation duct to flow along the outer wall of the secondary-separation chamber; (iii) directing the innerly located debris-depleted stream from the primary-separation duct to flow radially inward of the debris-enriched stream; and (iv) further separating the streams of air bearing entrained lawn debris into an upwardly and inwardly directed debris-depleted stream and a downwardly and outwardly directed debris-enriched stream; (D) a generally centrally located passage at least 4" in diameter and having an entrance and an exit, and having the perimeter of the entrance located at least 2" radially inward from the generally annular outer wall of the secondary-separation chamber, wherein the generally centrally located passage is adapted for: (i) receiving the upwardly and inwardly directed debris-depleted stream from the secondary-separation chamber through the entrance, and (ii) conducting the upwardly and inwardly directed debris-depleted stream to the exit and discharging it into the atmosphere; (E) a baffle extending generally outwardly from a central point below the entrance to the passage, having the outer periphery of the baffle spaced at least 1" inwardly from the generally annular outer wall, and having the outer periphery disposed less than 15" below the entrance to the passage; and (F) an opening around the baffle into the interior of an accumulation chamber below the baffle; wherein the baffle is disposed to permit passage of entrained yard debris in the downwardly and outwardly directed debris-enriched stream into the accumulation chamber while impeding passage of fine particulates of reduced yard debris from the accumulation chamber into air discharged from the separation chamber through the passage.

BRIEF DESCRIPTION OF THE DRAWINGS

FIG. 1 is a perspective view of a typical apparatus made in accordance with the present invention and showing certain principal features of the apparatus.

FIG. 2 is a side view of the apparatus of FIG. 1 with a portion of the apparatus shown in cross section view along the lines of 2—2 of FIG. 1.

FIG. 3 is a top view of a portion of the apparatus of FIG. 1 with the transfer duct 92 removed at cross-section view along the lines of 3—3 in FIG. 2 to show elements of power supply to the chipper shredder and the collector rotor.

FIG. 4 is a close-up view of the apparatus in FIG. 2 showing airflow around the lower collector lip.

FIG. 17 is a side view of a riding lawnmower having a collector assembly and a separator of this invention.

FIG. 18 is a cross-section view of selected portions of the riding lawnmower shown in FIG. 17.

DESCRIPTION OF THE PREFERRED EMBODIMENT

Figures 5, 6, 7:
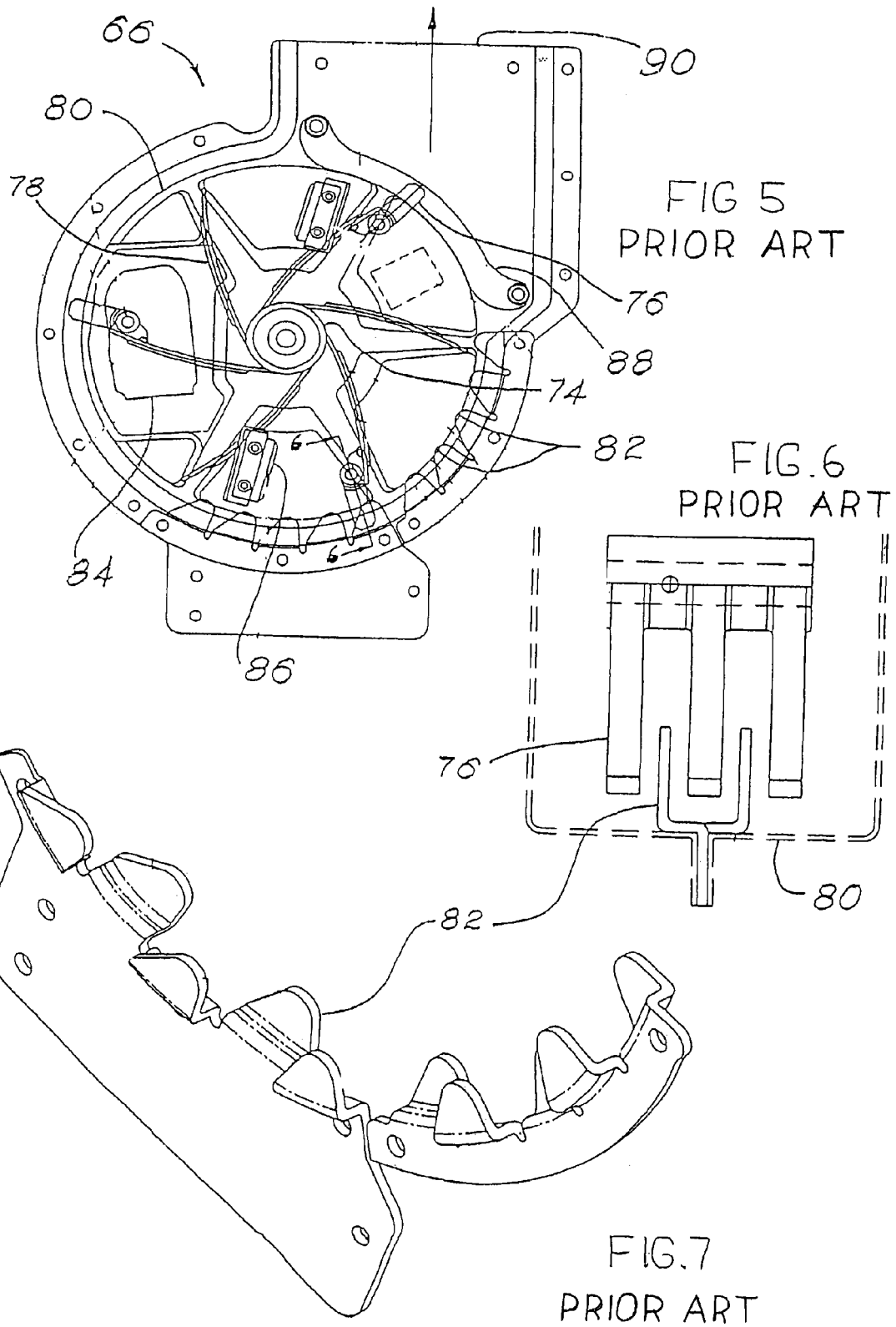
FIG. 5 is a front view of the chipper shredder shown as a cross section view along the lines of 5—5 of FIG. 2.
FIG. 6 is a cross section view of the chipper shredder taken along lines 6—6 in FIG. 5 and showing the interaction of the swing hammers with the inwardly protruding teeth.
FIG. 7 is a perspective isolated view of the inwardly protruding teeth shown at 82 in FIG. 5.

In FIG. 1, deep collector 22 rests on surface 24 bearing deep yard debris 26 comprising primarily leaves, twigs, clippings and other materials such as usually accumulate on lawns, sidewalks and patios in the vicinity of trees in the autumn. Frame 28 of deep collector 22 comprises right support plate 30, left support plate 32, base-plate 34 and control handle structure 36. Upper housing 38 spans from right support plate 30 to left support plate 32. Rotor shaft 40 journaled between left and right support plates 30 and 32 carries a plurality of rotor blades 42, each of which is preferably substantially gas impervious and bears a rotor tip which, in FIG. 1, may be a substantially gas impervious flexible rotor blade tip such as that indicated at 44. Rotor pulley 46 mounted on rotor shaft 40 engages drive belt 48 which also engages idler pulley 50 mounted on lever arm 52 pivotably mounted on right support plate 30. Drive pulley 54 is connected to motive means 146 for powering deep collector 22. By pivoting lever arm 52 clockwise, idler pulley 50 tightens drive belt 48, drawing it into firm engagement with rotor pulley 46 and drive pulley 54, rotating rotor shaft 40 bearing rotor blades 42 and flexible rotor blade tips 44, which engage surface 24 upon rotation of rotor shaft 40. A shaft with rollers 47 can be raised and lowered on the support plates 30 and 32 to conversely lower and raise the rotor blade tips 44 relative to surface 24.

FIG. 3 shows details of power delivery to chipper shredder 66 and drive pulley 54. Conventional engine 146 disposed on base plate 34 has engine crankshaft 148 extending into chipper shredder 66, chipper shredder rotor 74 being mounted on said engine crankshaft. Engine drive belt 150 engages engine drive pulley 152 disposed on engine crankshaft 148 and second pulley 154 disposed on first power shaft 156. Reducing-angle drive 158 disposed at the intersection of first power shaft 156 and second power shaft 160 transmits power to drive pulley 54.

As shown in FIG. 2, as rotor blades 42 are driven counterclockwise, flexible rotor tips 44 proximately engage upper housing 38 impeding substantial passage of air between upper housing 38 and rotor blades 42. As the arc of upper housing 38 is at least a significant fraction of the included angle between adjacent rotor blades 42, a substantial seal to passage of air is provided above rotor shaft 40 throughout much or all of the rotation cycle of said rotor shaft. In preferred embodiments, rotor shaft 40 is at least about 2" above surface 24, facilitating engagement of rotor blade tips 44 with deep yard debris 26 having a depth considerably greater than 2". In more preferred embodiments, upper lip 58 on upper housing 38 will be at least about 4" inches above surface 24 permitting engagement with yard debris 26 having a depth of that order of magnitude. In more preferred embodiments, upper lip 58 of upper housing 38 will be disposed at least about 8" inches above surface 24, more preferably at least about 12". Yard debris 26 engaged between adjacent rotor blade tips 44 is thereby impelled rearwardly toward collector duct 60 defined between upper collector shell 62 and lower collector shell 64. Suction is supplied to collector duct 60 by chipper shredder unit 66 which may be of any conventional construction such as that shown in U.S. Pat. No. 5,931,396. For typical yard debris having a depth of several inches, we have obtained good results with units providing at least about 20, preferably over 40, cubic feet per minute (cfm) of air flow per inch of width of the suction intake. While it is desirable to have considerable shredding action to reduce the volume of the debris collected, even the minimal amount of shredding provided by a sufficiently powerful fan can be adequate for effectively collecting leaves.

As generally indicated at 68 in FIG. 2, as flexible rotor blade tip 44 moves toward lower collector lip 70 between right support plate 30 and left support plate 32, flows of air having substantial components nearly parallel to surface 24 are induced in close proximity to surface 24. As shown in FIG. 4, as lower collector lip 70 is spaced from surface 24, forwardly and upwardly directed air flow generally indicated at 69 around lower collector lip 70 provides enhanced vacuuming effect at surface 24 during the period in which flexible rotor tips 44 are moving from the point of engagement with surface 24 toward lower collector lip 70. Ideally, the lowermost portion of lower collector lip 70 is spaced from surface 24 by a height of about one tenth to about three quarters of the height of the opening to collector duct 60. Particularly enhanced suction at surface 24 and air flow parallel to surface 24 occurs as each flexible rotor blade 44 draws into closest proximity with surface 24.

In some preferred embodiments, suction in collector duct 60 comprises a steady level of suction having superimposed therewith pulsed suction, this combination of steady and pulsed suction providing excellent ability to both induce flow of fine yard debris through collector duct 60 while also impelling heavier yard debris through said collector duct toward chipper shredder 66. Pulsing of the suction applied to collector duct 60 is thought to result from the variable opening created between flexible rotor blade tips 44 and surface 24 as flexible rotor blades 44 sweep rearwardly toward lower collector lip 70, attaining high velocity in collector duct 60 prior to rotor blade 42 and flexible rotor blade tip 44 coming into closest proximity with surface 24, and high suction as rotor blade 42 and flexible rotor blade tip 44 come into closest proximity with lower collector lip 70.

Variable stripping slot 72 defined between upper housing 38 and upper collector shell 62 admits a flow of air into voids between rotor blades 42, aiding in removal of yard debris contained therebetween and reducing cycling of yard debris around rotor shaft 40. Ideally, the width of variable stripping slot 72 is sized to provide enough of an impulse to remove debris which might otherwise be carried around with the rotor, without unduly compromising the vacuum flow used for removal of fine debris from the ground. We have found that a width of from about one tenth to about three quarters of the height of the opening to collector duct 60 is suitable for a 5 HP unit. We have also found that fillets 73 installed between adjacent rotor blades 42 aid in reducing the amount of debris which might otherwise be carried around with the rotor.

Airflow induced by chipper shredder 66 entrains yard debris 26 and transports said yard debris through collector duct 60 and into chipper shredder 66. FIGS. 5, 6, and 7 show features of a preferred embodiment of chipper shredder 66. A shredder rotor 74 with swing hammers 76 and fan blades 78 rotates in chipper shredder enclosure 80. Swing hammers 76 swing past inwardly protruding teeth 82, reducing the size of leaves and other entrained debris. An advantage of reducing the volume of the collected leaves and other debris with the invention is to make it possible to store a considerable mass of debris, reducing storage space while reducing the tendency for wind to disperse the leaves. Branches may be introduced into chipper shredder enclosure 80 through chipper shredder opening 84 and chipped by chipper knives 86. Reduced debris passes through elongated gaps in swing hammer screen 88 and outward through chipper shredder exhaust port 90.

Figure 8:
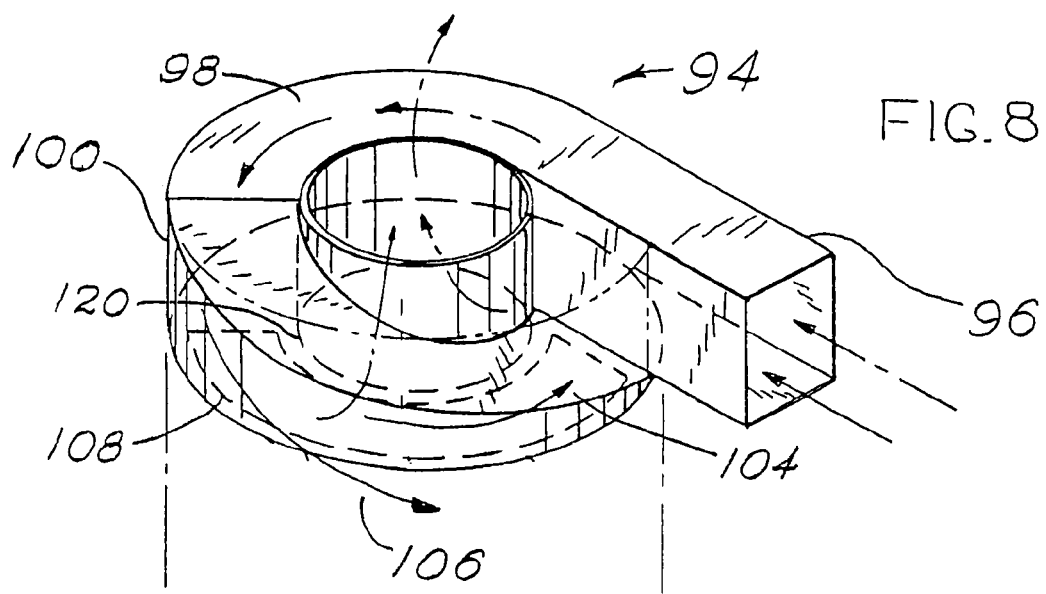
FIG. 8 is a perspective view of the primary separation loop shown in FIG. 1.

Entrained debris from chipper shredder unit 66 is impelled through transfer duct 92 to separator 94 which separates entrained debris from the entraining air. As shown in FIG. 8, debris entrained in air passes from transfer duct 92 into separator 94 through separator inlet duct 96. Primary separation occurs in primary separation duct 98 as the flow of air is redirected inwardly, while inertial forces urge debris solids toward perimetral wall 100 of primary separation duct 98, thereby forming a solids-depleted inner layer and a solids-enriched outer layer. Primary separation duct 98 directs the flow of air-entrained yard debris downwardly as it enters secondary separation chamber 102 in FIG. 9, impelling downward flow of both solids-depleted inner air layer generally indicated at 104 and solids-enriched outer layer generally indicated at 106 through transfer opening 108 between primary separation duct 98 and secondary separation chamber 102.

Figure 9:
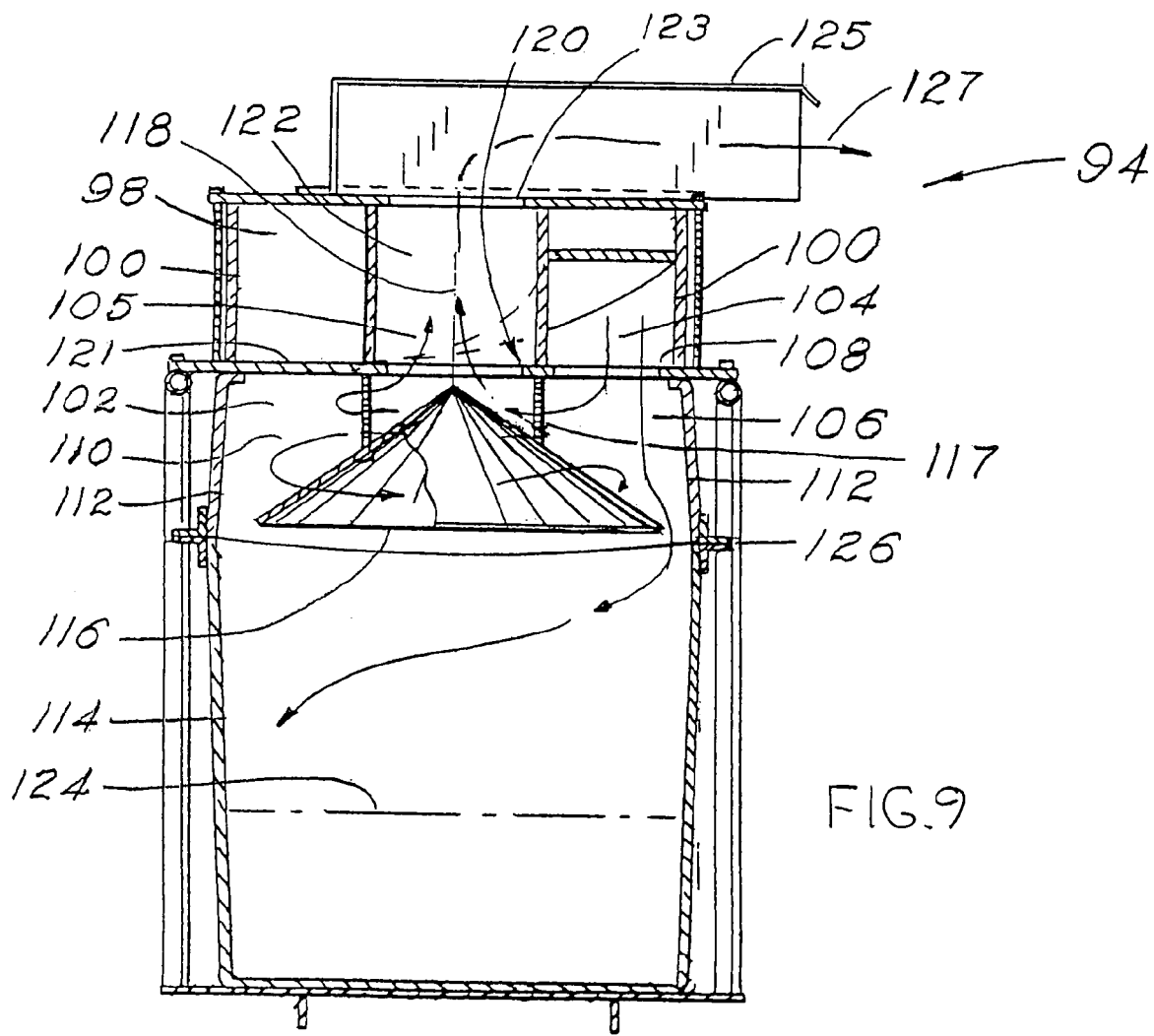
FIG. 9 is a cross sectional view of the separator and hopper as viewed along lines 9—9 in FIG. 2.

As shown in FIG. 9, solids-depleted inner air layer generally indicated at 104 flows downwardly in innermost portion of transfer opening 108, while solids-enriched outer layer generally indicated at 106 flows downwardly along first perimetral wall 100 into secondary separator chamber 102. Rotating airflow indicated generally at 110 swirls around secondary separation chamber 102, further separating debris into solids enriched outer layer 106, which passes along second perimetral wall 112 of secondary separation chamber 102 into hopper 114 below. To be most effective, this rotating airflow moves with a tangential velocity of at least about 2000 feet per minute measured close to second perimetral wall 112, causing the entrained reduced lawn debris to move outwardly toward second perimetral wall 112 of secondary-separation chamber 102 by action of body forces thereupon. Second perimetral wall 112 may consist of some combination of cylindrical and frusto-conical surfaces, and is referred to as a frusto-conical outer wall section. Swirling continues in hopper 114, while infundibulate baffle 116 impedes secondary flows of air containing finely reduced debris fragments from re-entering secondary separation chamber 102. In secondary separation chamber 102, solids-depleted inner air layer generally indicated at 105 migrates upwardly along the axis of secondary separation chamber 118, through exhaust entrance 120, which passes through upper bulkhead 121, and exits through exhaust passage 122 to the atmosphere. Infundibulate baffle 116 is suspended below secondary separation chamber 102 by supporting rods 117 or by other supporting means. If desired, deflector 125 can be placed adjacent to exit 123 of exhaust passage 122 to direct airflow generally indicated at 127 away from person operating apparatus.

As most of the separation is achieved by the action of body forces on the particles of entrained debris, the flow through the separator is substantially unimpeded—in contrast to those units in which filtration is primarily relied upon to remove the particulate debris from the air-stream in which it is entrained. Hence, this separator is referred to as a free-flow apparatus. Even though a minimal filter may be placed in the exhaust stream from the separator if so desired, the flow through the separator is substantially free of obstructions which might limit the flow of air significantly if filtration were relied upon for primary removal of heavy debris. Thus, the invention provides a machine which effectively separates the reduced yard debris from the air in which it is entrained, and which can be operated effectively for an extended period without either stopping to clear a filter in the separator, or experiencing decreased pick-up efficacy because of reduced air flow rate occasioned by partial blockage of a filter area.

Since the apparatus of the invention separates the debris from the air stream without relying primarily on a filter element, another aspect of the invention is to be able to collect the reduced debris in an impervious receptacle. Thus, the receptacle may be a barrel-like container, a fabric bag of limited permeability, a plastic bag, or a paper bag. One may also deploy a flexible container, such as a plastic or paper bag, within a rigid barrel-like container.

Another aspect of the invention is that it provides a machine having a separator and collector container low enough in height that the operator will be able to see over the separator in order to operate the machine effectively, while the collector container still has substantial capacity for accumulating debris. Accordingly, it is preferable that the overall height of the apparatus from the uppermost portion of the apparatus to the outer baffle periphery be less than about 1.2 times the inside diameter of the separation chamber as measured proximate the baffle periphery. It is further preferable that the plane of the baffle periphery be disposed below the lowermost portion of the upper bulkhead by a distance of less than about 0.6 times the inside diameter of the separation chamber. In some configurations, it is preferable that the baffle periphery be disposed below the lowermost portion of the entrance to the exhaust passage by a distance of less than about 0.6 times the inside diameter of the separation chamber.

Further in FIG. 9, upon being filled with retained debris 124, hopper 114 may be opened by sliding apart upper and lower flanges 126, allowing retained debris 124 accumulated therein to be discarded. Thus, another feature of the invention is in providing a debris-collection receptacle which can be emptied quickly and easily.

Figure 10:
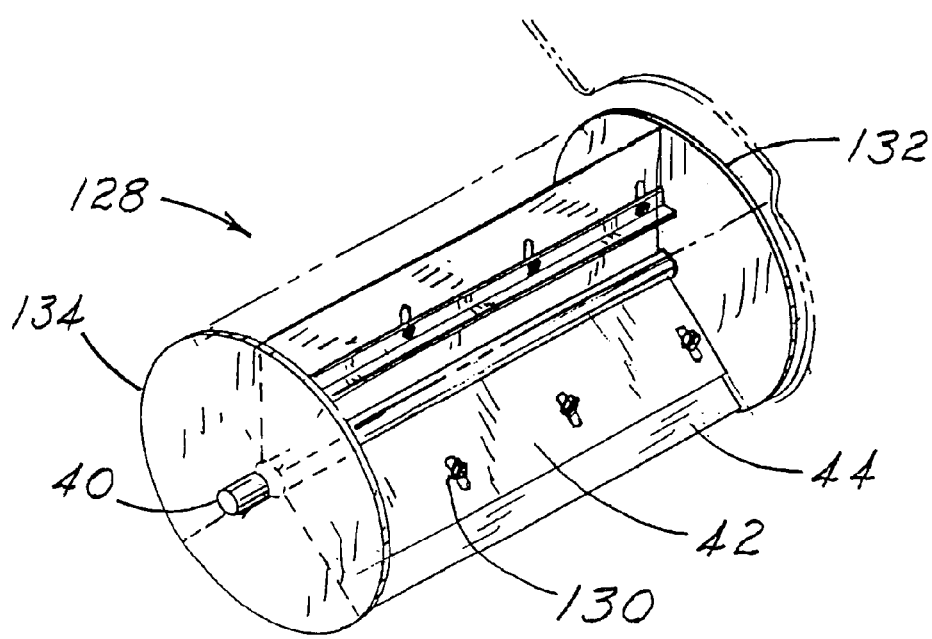
FIG. 10 is a perspective isolated view of the collector rotor shown in FIG. 1.

FIG. 10 further displays construction of collector rotor 128 comprising rotor shaft 40, rotor blades 42, flexible rotor blade tips 44, adjusting nuts 130 for adjusting flexible rotor blade tips 44 for proper engagement with surface 24, and left seal disc 132 and right seal disc 134 for assisting in rigidifying of rotor blades 42 while substantially impeding axial air flow into spaces between rotor blades 42.

Figure 11:
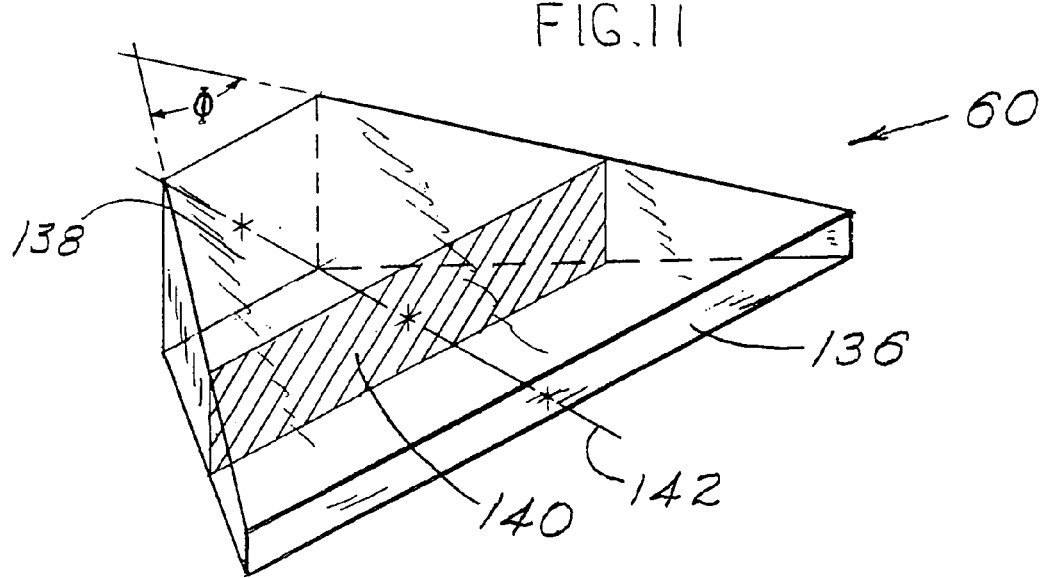
FIG. 11 is a schematic perspective view of the collector duct shown in FIG. 2, including notation for design parameters.

FIG. 11 shows a preferred configuration for collector duct 60, having a collector duct entrance 136, a collector duct exit 138, and a convergence angle $\Phi$ preferably less than about 120°. In preferred embodiments, convergence angle $\Phi$ will be less than 110°. In more preferred embodiments, convergence angle $\Phi$ will be less than 100°, most preferably less than 80°. In other preferred embodiments, the cross sectional area of collector duct 60 measured in planes (generally indicated at 140) perpendicular to central flow line (generally indicated at 142) will be approximately constant along length of collector duct 60. In more preferred embodiments, cross sectional area at any point along collector duct 60 will be within about 15 percent of the average of the minimum and maximum values.

Figure 12:
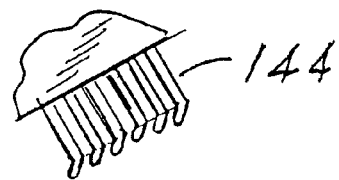
FIG. 12 is a schematic view of raking tips that can be used with the collector rotor shown in FIG. 10.

FIG. 12 displays optional raking tips 144 which may be attached to rotor blade 42, enabling use of deep collector 22 for raking debris from a grass-covered surface such as a lawn or other crinose surface such as Astroturf®.

Figure 13:
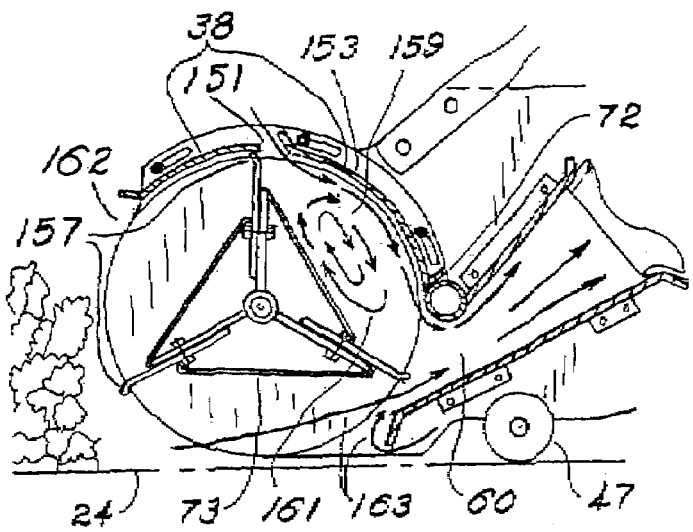
FIG. 13 is a cross-section view similar to a portion of FIG. 2, but showing a forward location of a stripping slot which admits air to strip leaves from the rotor.

FIG. 13 illustrates stripping slot 72 in a closed position and forward stripping slot 151 in upper housing 38 being located in a preferred forward position. The advantage of forward placement of stripping slot 151 is that air bleed into collection duct 60 occurs for only a fraction of the rotor revolution, instead of being almost continuous as with open rear stripping slot 72. Rear upper housing segment 153 spans the equivalent of about two thirds of the arc distance between adjacent rotor tips 157. Rotor blade tips 157 move in individual proximity with rear upper housing segment 153 for about two thirds of the revolution cycle, and air bleeds through forward stripping slot 151 for only about one third of the cycle. It appears that more of the air admitted to collection duct 60 comes from flows 163 along surface 24 and less from stripping slot 151, resulting in believed greater efficiency in collecting debris from surface 24. It also appears that air flow through forward stripping slot 151, through rotor cavity 159, and into collection duct 60 has more action in stripping leaves from rotor cavity 159 than would air flowing through rear stripping slot 72 and into cavity 159. However, even with airflow through forward stripping slot 151, rotational secondary flows were detected as generally indicated at 161. These secondary flows appeared to enable leaves to stay in rotor pockets 159 and carry over to open front 162 of the housing, where they were re-deposited on surface 24.

Figure 14:
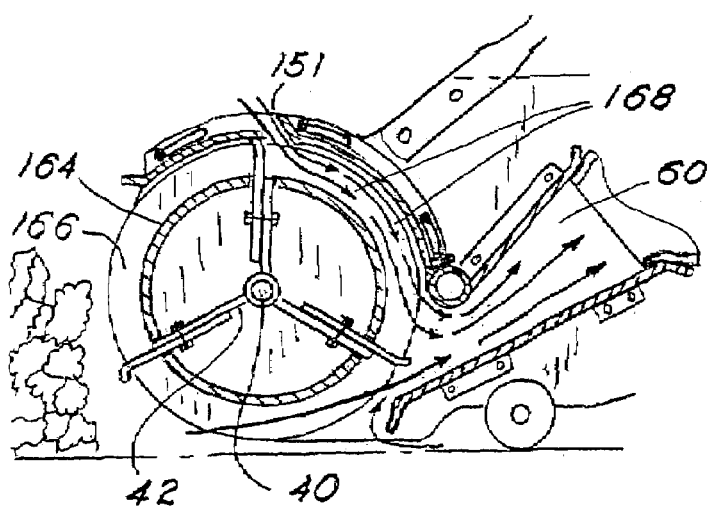
FIG. 14 is a cross-section view of a variation of the collector rotor shown in FIG. 13 in which flat fillets have been replaced with convex fillets.

FIG. 14 illustrates convex fillets 164 being used instead of flat fillets 73 shown in FIG. 2. Convex fillets 164 define thinner rotor cavities 166 that are generally concentric with rotor shaft 40 and which exhibit greatly reduced or no detectable macro-scale eddy flows upon airflow through forward stripping slot 151. One could use fillets having generally concentric, generally convex surfaces having a number of small flat, dimpled, or other shaped surfaces, and still achieve a generally convex cavity space. The shape and dimensions of said convex fillets should be chosen such that any substantial, detectable local flows generally indicated at 168 move rearward from forward stripping slot 151 to collection duct 60. Forward carryover and re-deposition of leaves were greatly reduced with use of convex fillets 164.

Figure 15:
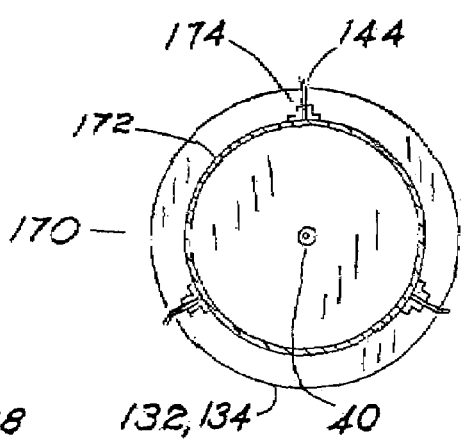
FIG. 15 is a cross-section view of a variation of the collector rotor shown FIG. 14 showing an alternative design for fabricating the collector rotor with convex fillet shapes.

An alternative construction of rotor 170 is illustrated in FIG. 15. One skilled in the art will recognize that as an alternative to constructing rotor 128 with blades 42 as in FIG. 10, and convex fillets 164 as in FIG. 14, one could employ a tubular member 172 concentric with rotor shaft 40 and having means 174 for attaching rotor blade tips 44 (FIG. 10) or raking tips 144 (FIG. 12).

Figure 16:
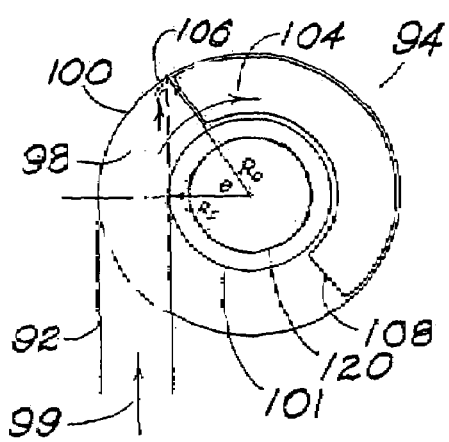
FIG. 16 is a schematic top-view diagram of the primary-separation duct showing mathematical notations for calculating minimal arc of curvature for effective separation of air and lawn debris.

FIG. 16 is a schematic top-view diagram of separator 94 shown in FIGS. 8 and 9. Primary-separation duct 98 has a radius RO of its curvilinear outer surface 100, a radius RI of its curvilinear inner surface 101, and a minimum arc of curvature $\Theta$ for effective separation of debris-laden air generally indicated at 99 into a solids-enriched outer layer generally indicated at 106 and a solids-depleted inner layer generally indicated at 104. Both layers pass through transfer opening 108 into secondary separator chamber 102 in FIG. 9, and then solids-depleted inner air layer passes upward through exhaust passage 120 in FIG. 16. Minimum arc of curvature for effective separation $\Theta$ is related to the radii of curvature by the expressions:

$$\text{cosine } \Theta = RI/RO; \text{ and}$$

$$\Theta = \text{arc cosine } RI/RO.$$

FIG. 17 illustrates riding lawnmower 176 having collector assembly 178 mounted at advancing entrance 180 of mower deck 182. Leaf fragments and grass clippings are separated from entraining air by separator 94 and retained in hopper 114.

FIG. 18 depicts a cross section view of selected portions of riding lawnmower 176 shown in FIG. 17. Leaves and other debris are impelled by collector rotor 170 into mowing chamber 186 within the mowing enclosure 188, where they are reduced by mower blades 190. Fan 192 induces airflow under collector rotor 170, through mowing chamber 186, first air duct 194, and second air duct 196, and into separator 94, entraining leaf fragments, grass clippings, and other debris into hopper 114.

EXAMPLE 1

A commercially marketed machine made according to the design shown in U.S. Pat. No. 5,642,864 was used to collect leaves on a lawn and shred them. The machine had an intake opening about 25 inches long and 4 inches wide with the damper at its maximum open position. The opening was inclined forward at about 45 degrees to the ground, giving an effective opening height of about 2.8". The chamber behind the damper was a solid rectangle in shape and about six inches front to back. A straight rectangular duct led from an opening in one end of the chamber to the center of a chipper-shredder-blower having its axis of rotation perpendicular to the direction of forward movement. The blower discharged into a large bag made of thick cloth and having a mesh-covered opening for venting entraining air. A zipper opening was provided for emptying collected debris.

A covering of fresh, dry leaves about three to six inches deep was present on the lawn. In addition, piles of leaves about six to twelve inches thick were also present. The machine was advanced into a pile of leaves, but the front opening pushed the leaves ahead of it instead of drawing the leaves into the opening. The machine was adjusted to raise the front opening to its maximum height, but it still pushed leaves ahead of it. Collection of leaves from the thinnest coverings on the lawn was attempted, but the machine still had a strong tendency to push leaves ahead of it. The damper was disconnected and opened as wide as possible, but still with little improvement in leaf collection.

In the belief that the machine performance was limited by low air flow caused by leaf build-up on the mesh opening and resultant flow restriction, the zipper opening was partially opened in the hope of allowing more air flow. Leaf pick-up by the vacuum slot improved somewhat, but was still unsatisfactory. In addition, a stream of leaf fragments blew through the zipper opening, as expected.

The conclusion was that the machine might work marginally well with a very thin layer one or two leaves thick, up to perhaps about an inch in depth, but this approach would require using the machine multiple times throughout normal leaf fall.

EXAMPLE 2

Following the experience of example 1, collecting leaves with a conventional 26-inch, two-stage snow blower was attempted to see if the auger-feed mechanism would function with leaves. Indeed, the auger readily fed even the deepest piles of leaves into the second-stage blower, which blew them 10–15 feet away. However, this approach left a thin layer of leaves and other debris on the lawn where the pick-up auger had passed.

The conclusion was that a machine with a similar auger-feed pick-up would collect even deep piles of leaves. However, the user would need to go over the lawn a second time with a different machine to collect the thin layer of residual leaves and other debris.

EXAMPLE 3

A machine of the current invention was built according to the drawings in FIGS. 1–11. A Yard Man 5-horsepower chipper-shredder-vacuum machine built by MTD Products was purchased; the chipper-shredder unit and attached drive motor were removed from the purchased machine; and then they were mounted on the base plate of the current machine. The machine width between the left support plate and the right support plate was 24." The collector rotor diameter was 15", and it turned 65 revolutions per minute. The front, upper edge of the housing over the rotor was about 13½" above the support surface. The lowermost portion of the lower collector lip was about 1" above the supporting surface when measured with the machine sitting on a concrete slab. The collector duct had an entrance opening 2½" high and 24" wide with a cross sectional area of 60 square inches, an exit opening about 6" high and 9" wide with a cross sectional area of about 54 square inches, and a convergence angle of 76°. The stripping slot was closed. The 5-horsepower engine turned 3450 revolutions per minute. The channel of the primary separation loop measured 4" wide and 8" high and ended with a constricted opening 1¾ wide and 8" high upstream of the downward sloping entrance to the secondary separation chamber. The effective curvature of the loop was about 305°, and the outside radius of curvature was about 10⅝". The inside diameter of the secondary separation chamber was about 23". The radial clearance between the perimeter of the baffle and the wall of the secondary chamber was about 1⅜", and the baffle perimeter was about 7" below the transfer opening. The exhaust port was 7" in diameter, and the airflow through the machine was about 540 cubic feet per minute (cfm) (22.5 cfm per inch of machine width). The effective hopper volume (below the baffle) was about 40 gallons.

Leaves were spread on a lawn in thicknesses varying from about 2" to about 10". The machine was set into operation and advanced through the leaves. Leaf overlayers of all thicknesses were readily collected, and no pushing of leaf piles ahead of the machine occurred. The volume of the leaves was reduced, and the leaf fragments were retained in the hopper. The entraining air exited through the separator exhaust passage, carrying with it only fine dust. Some leaves and debris were left in the wake of the machine, meaning that the machine was proving to be exceptionally effective in removing deep piles of leaves but left some finer debris behind. It appeared that the airflow was not quite great enough to get optimum cleaning. Also, it was observed that when the machine was pulled backward, the cleaning was more thorough, suggesting that the collector rotor should be turning faster.

Another observation was that some leaves were remaining with the collector rotor and carrying over the top of the rotor, being impelled onto the grass in front of the machine, or blown by side winds onto part of the lawn which had already been cleaned.

EXAMPLE 4

The machine of Example 3 was modified as follows: In order to increase the air flow rate, (1) the engine speed was increased from 3450 to 3680 revolutions per minute; (2) the constriction in the primary separation loop was removed, leaving the channel size throughout the loop at 4" wide and 8" high; (3) the transfer opening was enlarged to about 100 square inches; and (4) the separator exhaust port was enlarged from 7" to 9⅛" diameter. The airflow rate was then measured at 1000 cubic feet per minute (41.7 cfm per inch of machine width). The collector rotor speed was increased from 65 to 276 revolutions per minute. In order to reduce the number of leaves carried over the top of the turning collector rotor, the stripping slot was opened to 1". The diameter of the baffle in the separator was reduced, leaving an annular radial clearance of about 2⅜" between the baffle perimeter and the outside wall of the secondary chamber. The perimeter of the baffle was 5¼" below the ceiling of the secondary separation chamber.

The machine was operated in leaf overlayers of 3" to 12" and readily removed the leaves. No leaves and little other debris were left in the path of the machine, and carryover of leaves over the top of the collector rotor was reduced. The separator retained the leaf fragments and exhausted air containing only a small amount of very fine dust, and was judged to operate quite satisfactorily. It was considered remarkable that in the deep piles of leaves the machine could be moved forward into the leaves at a pace and with a concomitant leaf-feed rate that began to overload the shredder, but the collector rotor, collector duct, and separator continued to function well.

EXAMPLE 5

In order to achieve more aggressive raking action to lift leaves and other debris from the lawn surface, the continuous but flexible rubberized rotor blade tips 44 were replaced with rake-like teeth shown in FIG. 12. To make these teeth, pieces of polycarbonate sheet plastic approximately 6" wide by 23⅜" long and 1/16" thick were sawn with parallel cuts spaced every ½," sawing from the long edge of the sheet 3" to the center of the sheet. The saw kerfs were about 1/32" wide; so that minimal airflow between adjacent teeth would occur. The tips of the "teeth" were bent about 30°. This bending was done with the polycarbonate sheet at room temperature. A strip of raker teeth was bolted to each of the rotor blades such that the teeth extended radially 5/16" beyond the edges of the seal discs on the ends of the rotor. By adjusting the height of the front-support rollers, the tips of the raker teeth were set about 1/16" above a flat concrete surface.

The machine was then operated on a lawn. The raker teeth readily removed leaves, hickory nuts, shells, dead grass, and even some live grass, especially if the machine was allowed to run in one place very long without moving. The conclusion is that one could adjust the machine to rake as aggressively as desired.

Another observation was that carryover of leaves, nuts, etc. over the top of the rotor was increased, perhaps due to the positive rake angle of the teeth.

EXAMPLE 6

After seeing leaves carried over the top of the collector rotor and discharged frontward in Example 5, an attempt was made to eliminate this carryover. The existing stripping slot was closed, and a new forward slot was cut in the arcuate housing as shown in FIG. 13. The slot was about 1 1/16" wide and began about 9⅝" forward of the closed stripping slot, as measured along the arc of the housing cover. Since the remaining continuous housing spanned approximately two thirds of the arc between two adjacent sets of raker teeth, a substantially impervious blade would be in close proximity to the housing two thirds of the time of each revolution of the rotor (Two ninths of the time for each individual blade; two thirds of the time cumulative for the three blades through one rotation). Thus, the blades moving under the housing would prevent significant reverse flow of air from occurring for roughly ⅔ of the time during a rotor revolution. Conversely, reverse flow (from the new slot to the collecting duct) was permitted for about ⅓ of a rotor revolution. Furthermore, the slot was placed such that when one rotor tip (or row of raker teeth) had just passed the new stripper slot and allowed reverse air flow through the slot and into the collector duct, the following rotor tip would be in general proximity to the lower collector lip 70. Thus, flow through the stripping slot occurred during a phase of the rotor revolution when diminished airflow would have been passing into the collector duct from the supporting surface anyway. The intent of this design was to minimize lost vacuuming effectiveness by trying to maintain as much airflow as possible along the lawn surface and into the collector duct.

Unfortunately, this change achieved little reduction in the amount of leaf carryover.

EXAMPLE 7

With the machine fan operating, and with the collection rotor stopped in the position shown in FIG. 13, a thread on the end of a wire was used as a "tell tale" to detect the directions of air movement in the space between the two blades forming a flow space adjacent to the new stripping slot and the collector duct. The airflow directions are sketched approximately in FIG. 13, showing there was a very strong reverse eddy. The presence of this eddy may help explain how there could still be strong carryover of the leaves, as this secondary air flow probably prevented stripping the leaves out of the cavity between the adjacent blades, even with the flat fillets in place.

To overcome the leaf carryover in the eddies, convex fillets were substituted for the flat ones, as shown in FIG. 14. The outer surfaces of the fillets were about 1½" radially inward of the tips of the raker teeth and about 1¼" radially inward of the perimeters of the rotor seal discs. Testing with the "tell tale" showed that the eddy flow had been eliminated, and that all of the detectable localized airflows in the reduced cavity were in the rearward direction—from the new stripping slot and toward the collection-duct entrance. Operation of the machine on a lawn showed that leaf carryover had in fact been greatly reduced. However, there was still some carryover of nuts and shells.

EXAMPLE 8

In an attempt to stop the carryover of nuts and shells, raker blades were made having teeth bent with a negative rake angle. The intent was to make sure the positive rake angles of the first raker teeth were not responsible for retaining the nuts on the rotor and enhancing carryover. However, upon operation of the machine on the lawn, carryover of nuts and shells with forward discharge continued. Notably, leaf pickup was not as effective as with the positive rake angle.

In the possibility that the carryover was simply a momentum effect, the collector rotor speed was reduced in half— from 276 to 138 rpm (with a rotor peripheral velocity of 542 feet per minute, or 6.16 miles per hour). The carryover of nuts, shells, and other dense debris almost completely stopped. The raker blades with positive rake angle were re-installed, and the carryover was still absent, while virtually complete removal of leaves and other debris from the lawn was achieved.

EXAMPLE 9

The bag-holder assembly of a Simplicity riding lawnmower model 12FCH42 was removed, and the hopper and separator were removed from the machine described in Examples 3 and 4. The hopper and separator were set on the back base plate of the Simplicity machine and were connected to the air duct which had been connected to the lawnmower bag-holder assembly. The Simplicity machine had a blower mounted on the right end of the 42-inch mower deck, and the duct transported air, clippings, and leaf debris from the blower to the entrance of the separator inlet duct. The blower delivered 770 cfm of entraining air, and the separator exhaust port was 9⅛" in diameter.

The lawnmower was operated on a lawn having a thin covering of leaves, and the grass had grown about 1½ inch since its previous cutting. The mower blades cut the grass and did some chopping of the leaves, and the blower directed the debris to the separator. The separator performed well, retaining the debris in the hopper and exhausting the air virtually free of debris fragments.

EXAMPLE 10

To evaluate the possibility that the machine could also function as a snow blower, the elbow in the transfer duct 92 was disconnected from the separator 94 and directed to one side of the machine. Without making any further changes, the machine was started and advanced into fresh snow about 3 to 4" deep. The combination rotor and vacuuming action successfully lifted the snow, which passed through the collector duct, into the shredder-blower, and out the discharge (transfer) duct.

As our invention, we claim:

1. An apparatus for collecting and reducing yard debris comprising:
   a. a frame adapted for movement in a principal direction upon a surface;
   b. a first duct mounted on said frame having an entrance and an exit;
   c. a collector rotor assembly comprising: a collector rotor body disposed at the entrance to said first duct having a substantially horizontal axis of rotation generally normal to said first direction; and a plurality of impeller elements mounted upon said collector rotor body, said impeller elements being adapted to:
      i. engage and sweep over said surface,
      ii. collect yard debris thereupon, and
      iii. impel said yard debris toward said duct entrance, said impeller elements extending radially from said collector rotor body by at least about one quarter of an inch;
      said collector rotor assembly and said first duct being configured for substantially untrammeled frontal engagement with yard debris having a depth of at least about two (2) inches;
   d. a second duct having an entrance and an exit;
   e. a blower unit, disposed between said exit to said first duct and said entrance to said second duct, adapted to:
      i. provide suction at said entrance of said first duct,
      ii. induce a flow of air through said first and second ducts, and
      iii. reduce yard debris entrained in said flow of air as it passes through said blower unit;
   f. an air-solids separator disposed at said exit to said second duct for separating said reduced yard debris in said flow of air induced by said blower into a debris-enriched stream and a debris-depleted stream;
   g. means for discharging said debris-depleted stream to the atmosphere;
   h. an accumulation operatively connected to said air-solids separator and adapted to receive said debris-enriched stream from said air-solids separator;
   i. means operatively connected to said blower unit and adapted to provide power to said blower unit; and
   j. means operatively connected to said collector rotor assembly and adapted to provide power to said collector rotor assembly.

2. The apparatus of claim 1 wherein said impeller elements extend radially at least about an inch from said collector rotor body.

3. The apparatus of claim 1 wherein said collector rotor assembly comprises a substantially gas-impervious impediment to unrestricted flow of air into said first duct and extends substantially athwart said entrance to said first duct.

4. The apparatus of claim 1 wherein said collector rotor assembly comprises three impeller elements generally equi-spaced around said collector rotor body.

5. The apparatus of claim 3 wherein said collector rotor assembly further comprises fillets extending between adjacent impeller elements for limiting carriage of yard debris around said collector rotor assembly, wherein said fillets partially define generally concentric interrupted annular cavity spaces between adjacent impeller elements.

6. The apparatus of claim 1 further comprising a housing adapted to limit the flow of air between said housing and said collector rotor assembly without substantially impeding air flow along said surface under said collector rotor assembly and into said entrance of said first duct, said housing:
   a. being disposed above said collector rotor assembly,
   b. engaging each of said impeller element tips in flow-limiting proximity seriatim, and
   c. being configured to permit substantially untrammeled frontal engagement of said collector rotor assembly with said yard debris having a depth of at least about two (2) inches.

7. The apparatus of claim 1 further comprising vertically extending seals carried on said frame adjacent to the ends of said collector rotor assembly for limiting axial flow of air flow into said collector rotor assembly.

8. The apparatus of claim 1 further comprising vertically extending seals carried on the ends of said collector rotor assembly for limiting axial flow of air into said collector rotor assembly.

9. The apparatus of claim 6 wherein said housing defines a frontal opening extending from said surface vertically to a height of at least four inches and a suction opening under said rotor extending rearwardly from the front of said apparatus at least to a line below said axis of rotation of said collector rotor body.

10. The apparatus of claim 6 wherein said impeller elements mounted on said collector rotor body are configured to allow intermittent rearward rushes of air under the forward side of said rotating rotor body into said entrance to said first duct, and pulsed forward rushes of air under said first duct and into said first duct entrance, thereby alternatingly collecting principally bulky yard debris from said forward side of said rotor body during said rearward rushes of air and enhancing collection of residual debris from said surface during said pulsed forward rushes of air.

11. The apparatus of claim 6 further comprising an air-slot defined within said housing between the upper lip of said housing and said entrance to said first duct for allowing flow of air in a direction opposed to the direction of rotation of said collector rotor body and into said first duct and stripping leaves and debris from said rotating rotor assembly.

12. The apparatus of claim 1 wherein said entrance to said first duct generally spans the length of said collector rotor body and said first duct converges rearwardly such that the convergence angle throughout the duct is generally less than 100 degrees.

13. The apparatus of claim 1 wherein said air-solids separator comprises:
   a. a first passage for accepting said flow of air bearing entrained reduced yard debris from said second duct;
   b. a separation chamber adapted to receive said flow of air from said first passage;
   c. a second passage adapted to exhaust said debris-depleted stream from said separation chamber into the atmosphere; and
   d. a baffle for:
      i. generally inhibiting secondary flow from said accumulator; and
      ii. impeding re-entrainment of fine particulates in said debris-depleted stream as it is discharged to the atmosphere;
      said baffle being disposed between said separation chamber and said accumulator; and
      said baffle being disposed to permit passage of entrained reduced yard debris into said accumulation means while impeding passage of fine particulates of reduced yard debris in air exhausted from said separation chamber through said second passage.

14. The apparatus of claim 1 wherein the tips of said impeller elements further comprise pliable blades adapted for engaging an undulating surface, said pliable blades being yieldable to hard objects encountered on said surface, but being sufficiently stiff to sweep debris from undulations present in said surface.

15. The apparatus of claim 1 wherein the tips of said impeller elements comprise rows of radially-extending raker teeth adapted to engage and impel debris objects on said surface toward said entrance of said first duct.

16. The apparatus of claim 1 wherein the cross-sectional area of the channel through said first duct measured normal to the center flow line of said airflow through said first duct remains generally constant along said center flow line.

17. The apparatus of claim 1 further comprising a lawnmower mounted on said frame wherein said collector rotor assembly is disposed along the advancing front of said lawnmower, and said entrance of said first duct is operatively connected to said lawnmower to receive said yard debris.

18. The apparatus of claim 17 wherein said collector rotor assembly impels said yard debris into the mowing chamber within the mowing enclosure of said lawnmower, and said entrance of said first duct receives said yard debris from a discharge opening of said mowing enclosure.

19. The apparatus of claim 1 further comprising at least one adjustable-height roller adjacent said collector rotor assembly adapted for supporting said collector rotor assembly at adjustable heights above said surface whereby the degree of engagement of said impeller elements with said surface may be controlled.

20. The apparatus of claim 1 wherein said collector rotor assembly is adapted to rotate with an impeller tip velocity of at least about three miles per hour.

21. The apparatus of claim 1 wherein said first duct converges between said duct entrance and said duct exit.

22. The apparatus of claim 1 wherein said entrance of said first duct generally spans the length of said collector rotor body.

23. The apparatus of claim 1 wherein said entrance of said first duct generally spans the collective width of said impeller elements.

24. The apparatus of claim 1 wherein said first duct has a convergence angle of less than about 120°.

25. The apparatus of claim 1 wherein said air-solids separator comprises a free- flow apparatus for separating said lawn debris from said flow of air by action of body forces thereupon.

26. An apparatus for collecting and reducing yard debris comprising:
   a. a frame adapted for movement in a principal direction upon a surface;
   b. a first duct mounted on said frame having an entrance and an exit;
   c. a collector rotor assembly comprising: a collector rotor body disposed at the entrance to said first duct having a substantially horizontal axis of rotation generally normal to said first direction; and a plurality of impeller elements mounted upon said collector rotor body, said impeller elements being adapted to:
      i. sweep over said surface,
      ii. collect yard debris thereupon, and
      iii. impel said yard debris toward said duct entrance, said impeller elements extending radially from said collector rotor body by at least about one quarter of an inch;

said collector rotor assembly further comprising fillets extending between adjacent impeller elements for limiting carriage of yard debris around said collector rotor assembly;
    said collector rotor assembly and said first duct being configured for substantially untrammeled frontal engagement with yard debris having a depth of at least about two (2) inches;
d. a second duct having an entrance and an exit;
e. a blower unit, disposed between said exit to said first duct and said entrance to said second duct, adapted to:
    i. provide suction at said entrance of said first duct,
    ii. induce a flow of air through said first and second ducts, and
    iii. reduce said yard debris entrained in said flow of air as it passes through said blower unit;
f. an air-solids separator disposed at said exit to said second duct for separating said reduced yard debris in said flow of air induced by said blower into a debris-enriched stream and a debris-depleted stream;
g. an accumulator operatively connected to said air-solids separator and adapted to receive said debris-enriched stream from said air-solids separator;
h. means operatively connected to said blower unit and adapted to provide power to said shredder unit; and
i. means operatively connected to said collector rotor assembly and adapted to provide power to said collector rotor.

27. The apparatus of claim 26 wherein said fillets mean partially define generally concentric interrupted annular cavity spaces between adjacent impeller elements, and wherein the radii of said fillets are at least about one third of the swing radii of the tips of said impeller elements mounted upon said collector rotor body.

28. An apparatus for collecting and reducing yard debris comprising:
a. a frame adapted for movement in a principal direction upon a surface;
b. a first duct mounted on said frame having an entrance and an exit;
c. a collector rotor assembly comprising: a collector rotor body disposed at the entrance to said first duct having a substantially horizontal axis of rotation generally normal to said first direction; and a plurality of impeller elements mounted upon said collector rotor body, said impeller elements being adapted to:
    i. sweep over said surface,
    ii. collect yard debris thereupon, and
    iii. impel said yard debris toward said duct entrance, said impeller elements extending radially from said collector rotor body by at least about one quarter of an inch;
    said collector rotor assembly and said first duct being configured for substantially untrammeled frontal engagement with yard debris having a depth of at least about two (2) inches;
d. a lawnmower mounted on said frame wherein the collector rotor assembly is disposed along the advancing front of said lawnmower and the entrance of the first duct is operatively connected to said lawnmower to receive said yard debris;
e. a second duct having an entrance and an exit;
f. a blower unit, disposed between said exit to said first duct and said entrance to said second duct, adapted to:
    i. provide suction at said entrance of said first duct,
    ii. induce a flow of air through said first and second ducts, and
    iii. reduce yard debris entrained in said flow of air as it passes through said blower unit;
g. an air-solids separator disposed at said exit to said second duct for separating said reduced yard debris in said flow of air induced by said blower into a debris-enriched stream and a debris-depleted stream;
h. an accumulator operatively connected to said air-solids separator and adapted to receive said debris-enriched stream from said air-solids separator;
i. means operatively connected to said blower unit and adapted to provide power to said blower unit; and
k. means operatively connected to said collector rotor assembly and adapted to provide power to said collector rotor.

29. The apparatus of claim 28 wherein said collector rotor assembly impels said yard debris into the mowing chamber within the mowing enclosure of said lawnmower and said entrance of said first duct receives said yard debris from a discharge opening of said mowing enclosure.

30. An apparatus for collecting and reducing yard debris comprising:
a. a frame adapted for movement in a principal direction upon a surface;
b. a first duct mounted on said frame having an entrance and an exit;
c. a collector rotor assembly comprising: a collector rotor body disposed at the entrance to said first duct having a substantially horizontal axis of rotation generally normal to said first direction; and a plurality of impeller elements mounted upon said collector rotor body, said impeller elements being adapted to:
    i. sweep over said surface,
    ii. collect yard debris thereupon, and
    iii. impel said yard debris toward said duct entrance, said impeller elements extending radially from said collector rotor body by at least about one quarter of an inch;
    wherein said collector rotor assembly comprises a substantially gas-impervious impediment extending substantially athwart said entrance to said first duct to direct flow of air along said surface into said first duct; and
    said collector rotor assembly and said first duct being configured for substantially untrammeled frontal engagement with yard debris having a depth of at least about two (2) inches;
d. a second duct having an entrance and an exit;
e. a blower unit, disposed between said exit to said first duct and said entrance to said second duct, adapted to:
    i. provide suction at said entrance of said first duct,
    ii. induce a flow of air through said first and second ducts, and
    iii. reduce yard debris entrained in said flow of air as it passes through said blower unit;
f. an air-solids separator disposed at said exit to said second duct for separating said reduced yard debris in said flow of air induced by said blower into a debris-enriched stream and a debris-depleted stream;
g. an accumulator operatively connected to said air-solids separator and adapted to receive said debris-enriched stream from said air-solids separator;
h. means operatively connected to said blower unit and adapted to provide power to said blower unit; and
i. means operatively connected to said collector rotor assembly and adapted to provide power to said collector rotor.

31. The apparatus in claim 30 further comprising a housing adapted to limit the flow of air between said housing and said collector rotor assembly without substantially impeding air flow along said surface under said collector rotor assembly and into said entrance of said first duct, said housing:
 a. being disposed above said collector rotor assembly,
 b. engaging each of said impeller element tips in flow-limiting proximity seriatim, and
 c. being configured to permit substantially untrammeled frontal engagement of said collector rotor assembly with said yard debris having a depth of at least about two (2) inches.

32. An apparatus for collecting and reducing yard debris comprising:
 a. a frame adapted for movement in a principal direction upon a surface;
 b. a first duct mounted on said frame having an entrance and an exit;
 c. a collector rotor assembly comprising: a collector rotor body disposed at the entrance to said first duct having a substantially horizontal axis of rotation generally normal to said first direction; and a plurality of impeller elements mounted upon said collector rotor body, said impeller elements being adapted to:
  i. sweep over said surface,
  ii. collect yard debris thereupon, and
  iii. impel said yard debris toward said duct entrance,
   said impeller elements extending radially from said collector rotor body by at least about one quarter of an inch;
   said collector rotor assembly and said first duct being configured for substantially untrammeled frontal engagement with yard debris having a depth of at least about two (2) inches;
 d. a second duct having an entrance and an exit;
 e. a blower unit, disposed between said exit to said first duct and said entrance to said second duct, adapted to:
  i. provide suction at said entrance of said first duct,
  ii. induce a flow of air through said first and second ducts, and
  iii. reduce yard debris entrained in said flow of air as it passes through said blower unit;
 f. an air-solids separator disposed at said exit to said second duct for separating said reduced yard debris in said flow of air induced by said blower into a debris-enriched stream and a debris-depleted stream;
 g. an accumulator operatively connected to said air-solids separator and adapted to receive said debris-enriched stream from said air-solids separator;
 h. means operatively connected to said blower unit and adapted to provide power to said blower unit; and
 i. means operatively connected to said collector rotor assembly and adapted to provide power to said collector rotor;
  wherein said collector rotor assembly is adapted to rotate with an impeller tip velocity of at least about three miles per hour.

33. An apparatus for collecting and reducing yard debris comprising:
 a. a frame adapted for movement in a principal direction upon a surface;
 b. a first duct mounted on said frame having an entrance and an exit;
 c. a collector rotor assembly comprising: a collector rotor body disposed at the entrance to said first duct having a substantially horizontal axis of rotation generally normal to said first direction; and a plurality of impeller elements mounted upon said collector rotor body, said impeller elements being adapted to:
  i. sweep over said surface,
  ii. collect yard debris thereupon, and
  iii. impel said yard debris toward said duct entrance,
   said impeller elements extending radially from said collector rotor body by at least about one quarter of an inch;
   said collector rotor assembly and said first duct being configured for substantially untrammeled frontal engagement with yard debris having a depth of at least about two (2) inches;
 d. a second duct having an entrance and an exit;
 e. a blower unit, disposed between said exit to said first duct and said entrance to said second duct, adapted to:
  i. provide suction at said entrance of said first duct,
  ii. induce a flow of air through said first and second ducts, and
  iii. reduce yard debris entrained in said flow of air as it passes through said blower unit;
 f. an air-solids separator disposed at said exit to said second duct for separating said reduced yard debris in said flow of air induced by said blower into a debris-enriched stream and a debris-depleted stream;
 g. an accumulator operatively connected to said air-solids separator and adapted to receive said debris-enriched stream from said air-solids separator;
  said air-solids separator and said accumulator having a baffle disposed between said air-solids separator and said accumulator for:
   i. generally inhibiting secondary flow from said accumulator, and
   ii. impeding re-entrainment of fine particulates in said debris-depleted stream as it is discharged to the atmosphere;
 h. means operatively connected to said blower unit and adapted to provide power to said blower unit; and
 i. means operatively connected to said collector rotor assembly and adapted to provide power to said collector rotor.

34. An apparatus for collecting and reducing yard debris comprising:
 a. a frame adapted for movement in a principal direction upon a surface;
 b. a converging duct mounted on said frame having an entrance and an exit;
 c. a collector rotor assembly comprising: a collector rotor body disposed at the entrance to said converging duct having a substantially horizontal axis of rotation generally normal to said first direction; and a plurality of impeller elements mounted upon said collector rotor body, said impeller elements being adapted to:
  i. engage and sweep over said surface,
  ii. collect yard debris thereupon, and
  iii. impel said yard debris toward said converging duct entrance,
   said impeller elements extending radially from said collector rotor body by at least about one quarter of an inch;
   said collector rotor assembly and said converging duct being configured for substantially untrammeled frontal engagement with yard debris having a depth of at least about two (2) inches;

d. a second duct having an entrance and an exit;
e. a blower unit, disposed between said exit to said converging duct and said entrance to said second duct, adapted to:
  i. provide suction at said entrance of said converging duct, and
  ii. induce a flow of air through said converging and second ducts;
f. an air-solids separator disposed at said exit to said second duct for separating said yard debris in said flow of air induced by said blower into a debris-enriched stream and a debris-depleted stream;
g. means for discharging said debris-depleted stream to the atmosphere;
h. an accumulator operatively connected to said air-solids separator and adapted to receive said debris-enriched stream from said air-solids separator;
i. means operatively connected to said blower unit and adapted to provide power to said blower unit; and
j. means operatively connected to said collector rotor assembly and adapted to provide power to said collector rotor assembly.

35. The apparatus of claim 34 wherein said converging duct converges from said duct entrance to said duct exit.

36. The apparatus of claim 34 wherein said entrance of said converging duct generally spans the collective width of said impeller elements.

37. The apparatus of claim 34 wherein said converging duct has generally equal cross-sectional area along its length.

38. The apparatus of claim 34 wherein said air-solids separator comprises a free-flow apparatus for separating said yard debris from said flow of air by action of body forces thereupon.

39. An apparatus for collecting and reducing yard debris comprising:
  a. a frame adapted for movement in a principal direction upon a surface;
  b. a converging duct mounted on said frame having an entrance and an exit;
  c. a second duct having an entrance and an exit;
  d. a blower unit, disposed between said exit to said converging duct and said entrance to said second duct, adapted to:
    i. provide suction at said entrance of said converging duct, and
    ii. induce a flow of air through said converging and second ducts,
    said converging duct having a convergence angle of less than about 120°;
  e. a collector rotor assembly comprising: a collector rotor body disposed at said entrance to said converging duct having a plurality of impeller elements mounted upon said collector rotor body, said impeller elements being adapted to:
    i. engage and sweep over said surface,
    ii. collect yard debris thereupon, and
    iii. impel said yard debris toward said entrance to said converging duct, said impeller elements extending from said collector rotor body by at least about one quarter of an inch;
    said collector rotor assembly and said converging duct being configured for substantially untrammeled frontal engagement with yard debris having a depth of at least about two (2) inches;
  f. an air-solids separator disposed at said exit to said second duct for separating said yard debris in said flow of air induced by said blower into a debris-enriched stream and a debris-depleted stream;
  g. means for discharging said debris-depleted stream to the atmosphere;
  h. an accumulator operatively connected to said air-solids separator and adapted to receive said debris-enriched stream from said air-solids separator;
  i. means operatively connected to said blower unit and adapted to provide power to said blower unit; and
  j. means operatively connected to said collector rotor assembly and adapted to provide power to said collector rotor assembly.

* * * * *